United States Patent [19]
Asano et al.

[11] Patent Number: 5,588,721
[45] Date of Patent: Dec. 31, 1996

[54] VIBRATION ANALYSIS OF THE ROTATING WHEEL FOR CONTROLLING ANTI-LOCK BRAKING OPERATION

[75] Inventors: Katsuhiro Asano; Masaru Sugai; Hiroyuki Yamaguchi; Takaji Umeno, all of Aichi-ken, Japan

[73] Assignee: Kabushiki Kaisha Toyota Chuo Kenkyusho, Aichi-ken, Japan

[21] Appl. No.: 519,965

[22] Filed: Aug. 28, 1995

[30] Foreign Application Priority Data

Aug. 29, 1994 [JP] Japan .................... 6-203510
Jun. 5, 1995 [JP] Japan .................... 7-138306

[51] Int. Cl.$^6$ ............................................ B60T 8/66
[52] U.S. Cl. ................................. 303/163; 303/194
[58] Field of Search ............................ 303/149, 150, 303/157, 163, 164, 165, DIG. 5, 194

[56] References Cited

U.S. PATENT DOCUMENTS 4,651,290  3/1987  Masaki et al. .
5,117,934  6/1992  Tsuyama et al. .

FOREIGN PATENT DOCUMENTS 3316208  11/1984  Germany .
61-196853  9/1986  Japan .
1-249559  10/1989  Japan .

*Primary Examiner*—Josie Ballato
*Attorney, Agent, or Firm*—Oblon, Spivak, McClelland, Maier & Neustadt, P.C.

[57] ABSTRACT

A braking force acting on the wheel is actuated by a very small amount at a resonant frequency of a vibrating system comprised of a vehicle body, a wheel, and road surface, and the amplitude of the resonant-frequency component of the wheel speed is detected. A gain in the amplitude of the resonant-frequency component of the wheel speed with respect to the amplitude of the very small actuation of the braking force is determined. A mean braking force is controlled to decrease when the gain is smaller than a reference value, and to increase when the gain is greater than the reference value.

23 Claims, 34 Drawing Sheets

F I G. 7
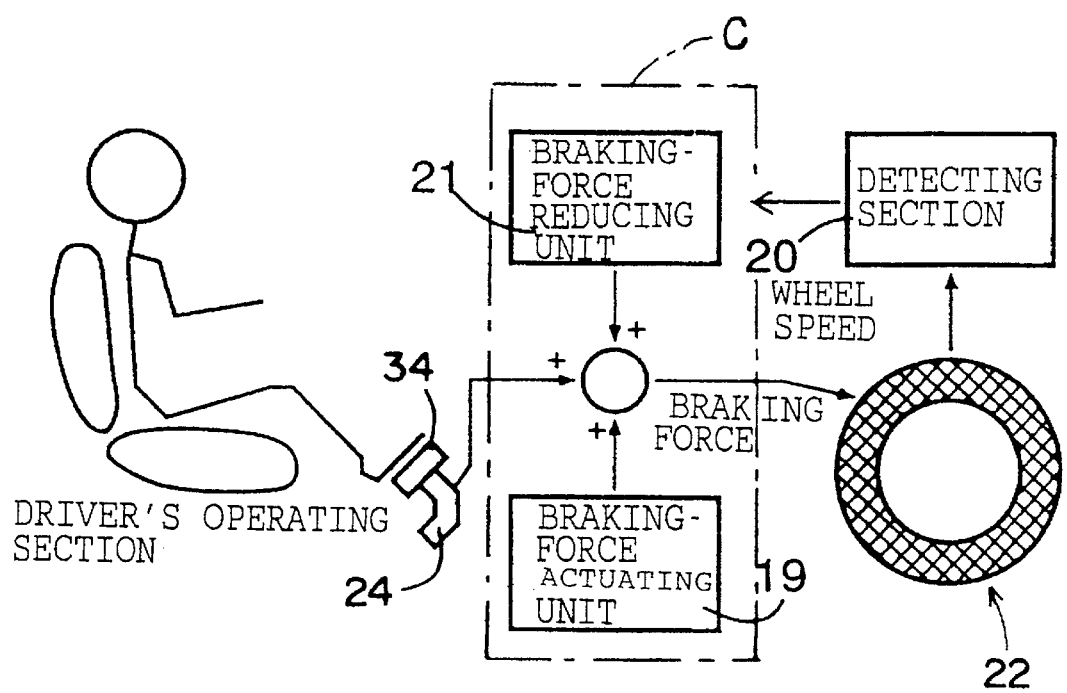

F I G. 15
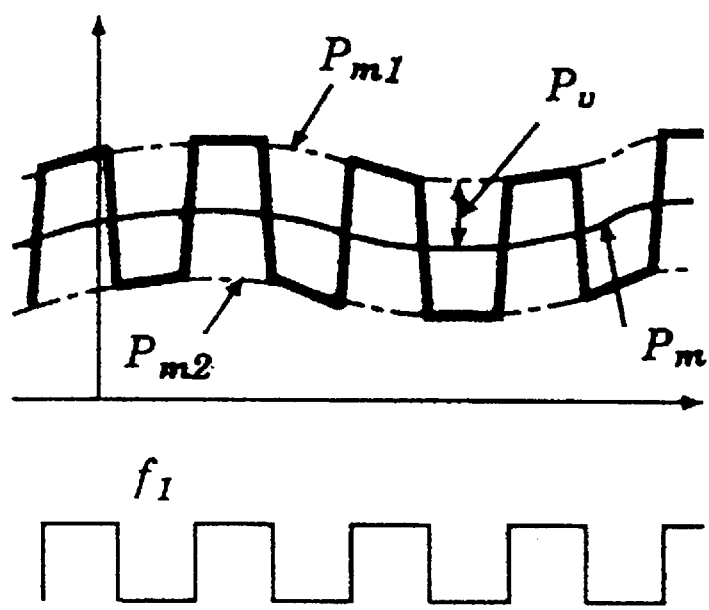

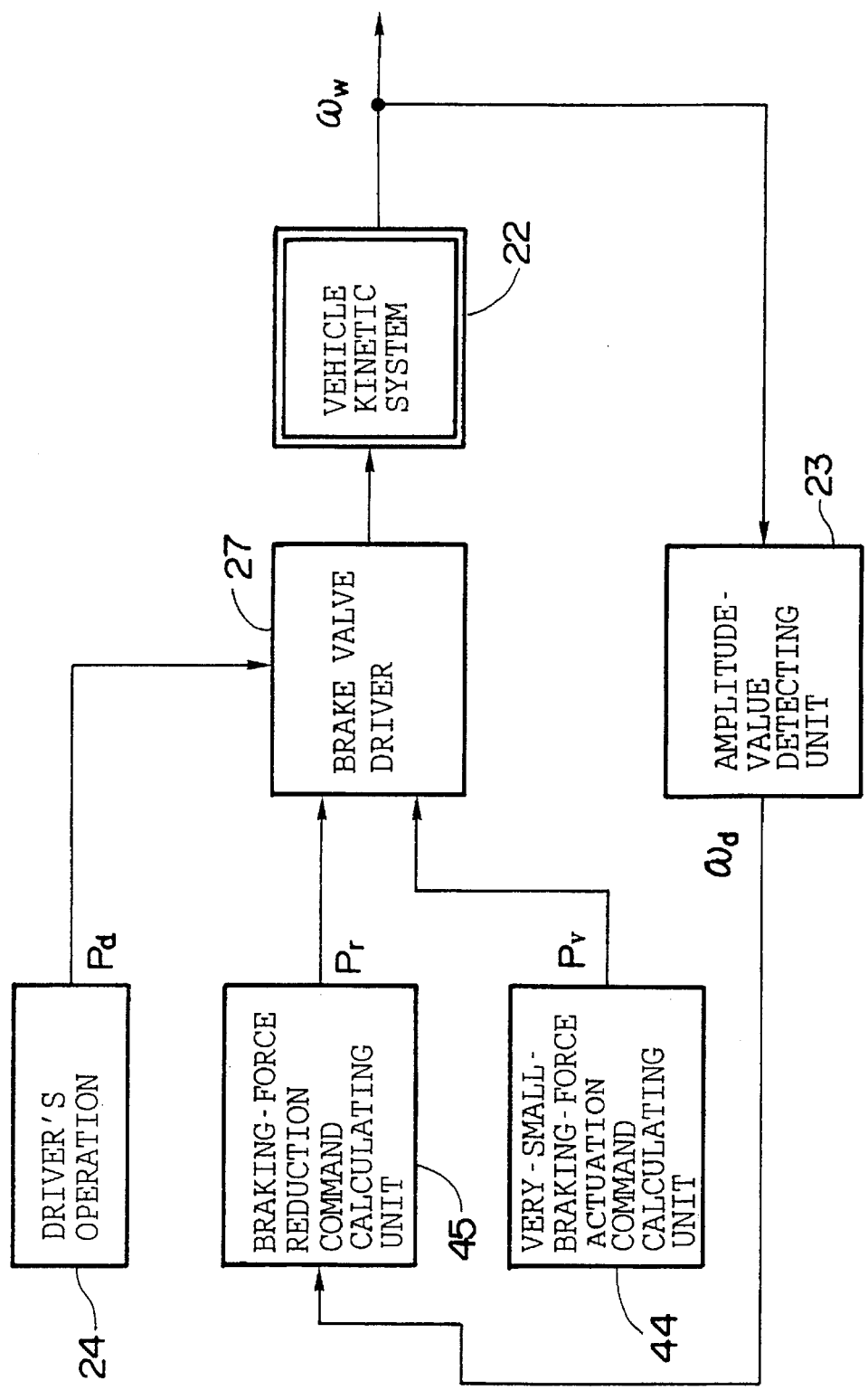

F I G. 2 5
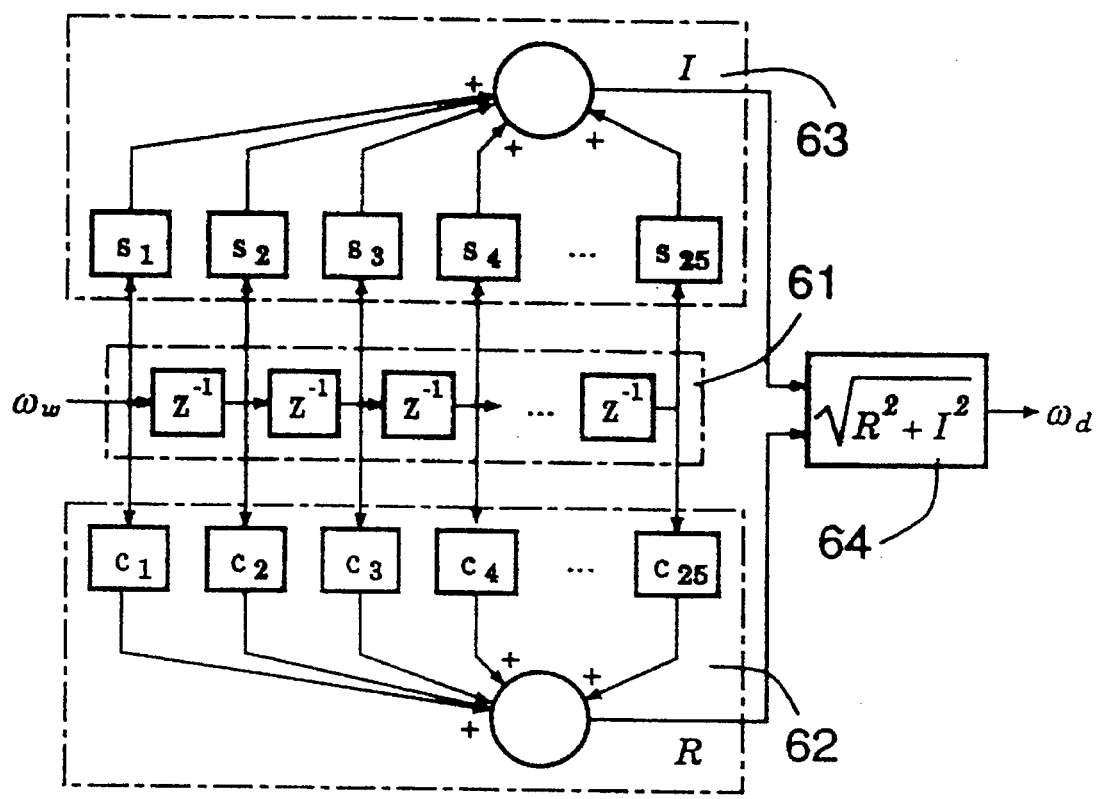

5,588,721

VIBRATION ANALYSIS OF THE ROTATING WHEEL FOR CONTROLLING ANTI-LOCK BRAKING OPERATION

BACKGROUND OF THE INVENTION

1. Field of the Invention

The present invention relates to an anti-lock brake controlling apparatus, and more particularly to an anti-lock brake controlling apparatus in which a braking force is controlled on the basis of a vibration characteristic appearing in the rotational speed of a wheel (wheel speed), so as to effect a braking operation such that the coefficient of friction between the wheel and the road surface reaches a maximum value (a peak value of $\mu$).

2. Description of the Related Art

A conventional anti-lock brake controlling apparatus prepares a vehicle-speed signal, a vehicle-acceleration/deceleration signal, or a speed signal approximating the vehicle speed on the basis of a signal from a wheel speed sensor, and the braking force is controlled by comparing them so as to effect an anti-lock braking operation.

That is, Japanese Patent Application Laid-Open No. 61-196853 discloses an anti-lock brake controlling apparatus in which the possibility of wheel locking is determined from a comparison between an estimated vehicle speed and a reference speed obtained from the wheel speed or the like which are estimated, and the braking force is reduced when there is a possibility of wheel locking. In this anti-lock brake controlling apparatus, an estimated vehicle speed $v_v$ is obtained by connecting the troughs of a speed $v_w$, obtained from the wheel speed, by a fixed gradient, as shown in FIG. 1. However, it can be seen that there is a difference between the estimated vehicle speed $v_v$ and an actual vehicle speed $v_{v*}$.

In addition, in this anti-lock brake controlling apparatus, to prevent the estimated vehicle speed $v_v$ from becoming greater than the actual vehicle speed $v_{v*}$ due to a change in the wheel ground-contact load during traveling on a bad road, the rate of increase in the estimated vehicle speed is suppressed in a case where the changes in wheel speed are more than those in the estimated vehicle speed.

If brakes are applied when a vehicle is traveling at a certain speed, slip occurs between the wheels and the road surface, and it is known that, as shown in FIG. 2, the coefficient of friction $\mu$ between the wheel and the road surface changes with respect to a slip ratio S which is expressed by the following Formula (1).

$$S=(v_{v*}-v_w)/v_{v*} \quad (1)$$

where $v_{v*}$ is the actual vehicle speed, and $v_w$ is the wheel speed.

In this $\mu$-S characteristic, the coefficient of friction $\mu$ reaches a peak value at a certain slip ratio (in a region A2 in FIG. 2). If the slip ratio at which the coefficient of friction $\mu$ reaches the peak value is known in advance, the slip ratio can be controlled by determining the slip ratio from the vehicle speed and the wheel speed.

For this reason, with the anti-lock brake controlling apparatus disclosed in Japanese Patent Application Laid-Open No. 1-249559, the slip ratio is calculated from an approximate value of the vehicle speed and the wheel speed or the like, and the braking force is controlled on the basis of a comparison between the calculated slip ratio and a set slip ratio. With this anti-lock brake controlling apparatus, a measure is provided not to set the brake pressure in a state of lowered pressure for a period more than necessary in order to prevent the vehicle from being set in a state of no brake for a long time due to the difference between the estimated vehicle speed $v_v$ and the actual vehicle speed $v_{v*}$.

As shown in FIG. 3, these conventional anti-lock brake controlling apparatuses are each comprised of: a vehicle-speed estimating section 2 for estimating the estimated vehicle speed $v_v$ from a wheel speed $\omega_w$ and a vehicle acceleration $v_v'$ (=$dv_v/dt$); and a braking-force controlling section 3 for controlling a braking force $P_b$ with respect to a driving system 1 of the vehicle by detecting the locked state of the wheel from the wheel speed $\omega_w$ and the estimated vehicle speed $v_v$.

However, with such conventional anti-lock brake controlling apparatuses, since the vehicle-speed estimating section is required, it is necessary to return the braking force until the speed $v_w$, determined from the wheel speed, and the actual vehicle speed $v_{v*}$ agree with each other or become close values, as shown in FIG. 1. For that reason, the increase and decrease of the braking force applied to the wheels need to be repeated at a relatively low frequency. In addition, since the estimated vehicle speed, as compared with a reference speed, is an approximate value determined from the wheel speed and the vehicle acceleration or the like, the estimated vehicle speed sometimes differs substantially from an actual vehicle speed. Hence, there have been problems in that, in some cases, the wheels lapse into a locked state for a long period of time, and that the braking force is reduced extremely for the purpose of returning to an unlocked state. Therefore, a considerable effect is exerted on the behavior of the vehicle, possibly resulting in an increase in the braking distance and uncomfortable vibrations.

Further, with the anti-lock brake controlling apparatus for controlling the braking force on the basis of the slip ratio, it can be readily estimated that the slip ratio at which the coefficient of friction becomes maximum varies depending on the state of the road surface on which the vehicle travels. As a measure against this problem, it has conventionally been necessary to detect and estimate states of the road surface, and prepare a plurality of reference slip ratios corresponding to the states of the road surface, or change the reference slip ratio in correspondence with the state of the road surface.

SUMMARY OF THE INVENTION

The present invention has been devised to overcome the above-described conventional drawbacks, and it is an object of the present invention to provide an anti-lock brake controlling apparatus which is capable of effecting an anti-lock braking operation stably on different traveling road surfaces without estimating the vehicle speed, not by detecting the locked state of the wheel(s) from a comparison of the wheel speed and the vehicle speed or a comparison of the slip ratio, but by detecting a change in the vibration characteristic of the wheel speed which is determined by the $\mu$-S characteristic.

To attain the above object, in accordance with a first aspect of the present invention, there is provided an anti-lock brake controlling apparatus comprising: detecting means for detecting a vibration characteristic of a wheel speed; and controlling means for controlling a mean braking force acting on a wheel on the basis of the detected vibration characteristic such that a slip ratio is not larger than a value at which a coefficient of friction between a tire and a road surface substantially reaches a peak value.

The anti-lock brake controlling apparatus in accordance with the first aspect of the present invention may further comprise: exciting or actuating means for causing the braking force acting on the wheel to be excited or actuated by a very small amount at a predetermined frequency.

In accordance with a second aspect of the present invention, there is provided an anti-lock brake controlling apparatus comprising: resonant-frequency detecting means for detecting a resonant frequency from a frequency distribution of a wheel speed; and controlling means for reducing a mean braking force acting on a wheel when the resonant frequency is greater than a reference value.

In accordance with a third aspect of the present invention, as shown in FIG. 4, there is provided an anti-lock brake controlling apparatus comprising: actuating means 7 for actuating by a very small amount a braking force acting on a wheel at a resonant frequency of a vibrating system constituted by a vehicle body, a wheel, and a road surface; detecting means 5 for detecting an amplitude of a component of the resonant frequency of a wheel speed; and controlling means 6 for reducing a mean braking force acting on the wheel when a gain in the amplitude of the resonant-frequency component of the wheel speed with respect to an amplitude of the very small excitation of the braking force is smaller than a reference value.

In the third aspect of the present invention, the anti-lock brake controlling apparatus may further comprise: physical-quantity detecting means for detecting the vehicle speed or a physical amount related to the vehicle speed, wherein the reference value is changed in dependence on the vehicle speed or the physical amount related to the vehicle speed detected by the physical-quantity detecting means.

In accordance with a fourth aspect of the present invention, there is provided an anti-lock brake controlling apparatus comprising: actuating means for exciting by a very small amount a braking force acting on a wheel at a resonant frequency of a vibrating system constituted by a vehicle body, a wheel, and a road surface at a fixed amplitude; detecting means for detecting an amplitude of a component of the resonant frequency of a wheel speed; and controlling means for reducing a mean braking force acting on the wheel when the amplitude of the resonant-frequency component of the wheel speed detected by the detecting means is smaller than a reference value.

In accordance with a fifth aspect of the present invention, there is provided an anti-lock brake controlling apparatus comprising: actuating means for exciting by a very small amount a braking force acting on a wheel at a resonant frequency of a vibrating system constituted by a vehicle body, a wheel, and a road surface and at a fixed amplitude corresponding to an amplitude command; detecting means for detecting an amplitude of a component of the resonant frequency of a wheel speed; and controlling means for determining the amplitude command such that the amplitude of the resonant-frequency component of the wheel speed detected by the detecting means becomes a reference value, the controlling means having means for reducing a mean braking force acting on the wheel when the amplitude command is greater than a reference amplitude value.

In accordance with a sixth aspect of the present invention, there is provided an anti-lock brake controlling apparatus comprising: actuating means for exciting by a very small amount a braking force acting on a wheel at a resonant frequency of a vibrating system constituted by a vehicle body, a wheel, and a road surface; detecting means for detecting a wheel speed; and controlling means for reducing a mean braking force acting on the wheel when a frequency at which a gain in the amplitude of the wheel speed with respect to an amplitude of the braking force becomes maximum is greater than a reference value.

First, the basic principle of the present invention will be described. Consideration is made by referring to a model shown in FIG. 8 in which the vibration of a wheel when a vehicle having a vehicle body 12 with weight W travels at a velocity v as shown in FIG. 5, i.e., the vibration of a vibrating system constituted by a vehicle body, a wheel, and a road surface, is modeled in terms of equivalency on a rotational axis of the wheel.

Here, the braking force acts on the road surface via the surface of a tire tread 15 coming into contact with the road surface Since this braking force actually acts on the vehicle body 12 as a reaction from the road surface, an equivalent model 17 calculated in terms of the rotational axis of the weight of the vehicle body is coupled to an opposite side to a wheel 13 via a frictional element between the tire tread and the road surface. This is similar to the fact that the weight of the vehicle body can be simulated by large inertia below the wheel, i.e., the mass on the opposite side to the wheel, as in the case of a chassis dynamometer.

In FIGS. 5 and 6, if the inertia of the wheel 13 including the tire and the rim is $J_w$, a spring constant of a spring element 14 between the rim and the tread 15 is K, the inertia of the tread 15 (the moment of inertia of the tread about the axis of rotation) is $J_t$, the coefficient of friction of the frictional element 16 between the tread 15 and the road surface is μ, and the inertia of the equivalent model 17 calculated in terms of the rotational axis of the weight of the vehicle body 12 is $J_v$, then the characteristics of the overall system can be expressed as shown in Formulas (2) to (4) below. Incidentally, the differential of the first order with respect to time, d/dt, is hereafter denoted by ('), and the differential of the second order with respect to time, $d^2/dt^2$, is denoted by (").

$$J_w \theta_w'' = -T + K(\theta_t - \theta_w) \quad (2)$$

$$J_t \theta_t'' = -K(\theta_t - \theta_w) + \mu WR \quad (3)$$

$$J_v \omega_v' = -\mu WR \quad (4)$$

Here, $$w_w = \theta_w' \quad (5)$$

$$J_v = R^2 W \quad (6)$$

$$\omega_v = v/r \quad (7)$$

where $\theta_w$ is the angle of rotation of the wheel 13; $\theta_w''$ is the angular acceleration of rotation; $w_w$ is the angular velocity of rotation, i.e., the wheel speed; $\theta_t$ is the angle of rotation of the tread 15; $\theta_t''$ is the angular acceleration of rotation of the tread 15; $\omega_v$ is the angular velocity of rotation in terms of the axis of rotation of the equivalent model 17 of the vehicle body; T is a braking torque applied to the wheel 13; W is the weight of the vehicle body; and R is the radius of the wheel. The braking torque T is actually applied by controlling the pressure $P_b$ of brake valves.

When the tire is gripping, if it is considered that the tread 15 and the equivalent model 17 of the vehicle body are directly coupled to each other, the inertia of the wheel 13 and the inertia of the sum of the inertia of the equivalent model 17 of the vehicle body and the inertia of the tread 15 resonate, and the resonant frequency $f_1$ of the wheel resonating system at this time is expressed by the following formula.

$$f_1 = \sqrt{\{(J_w + J_t + J_v)K/J_w(J_t + J_v)\}}/2\pi \tag{8}$$

This state corresponds to a region A1 in FIG. 2.

On the other hand, in case where the coefficient of friction $\mu$ approaches a peak value of $\mu$ (a peak value of a braking force), the coefficient of friction $\mu$ on the tire surface becomes difficult to change with respect to a slip ratio S, so that the component accompanying the vibration of the inertia of the tread 15 ceases to affect the equivalent model 17 of the vehicle body. That is, the tread 15 and the equivalent model 17 of the vehicle body are separated in terms of equivalency, so that the tread 15 and the wheel 13 cause resonance. The resonant frequency $f_2$ of the wheel resonating system at this time is expressed by the following formula.

$$f_2 = \sqrt{\{(J_w + J_t)K/J_wJ_t\}}/2\pi \tag{9}$$

This state corresponds to a region A2 shown in FIG. 2. Generally, upon reaching the point of the peak value of $\mu$, the coefficient of friction instantaneously shifts to a region A3, and the tire becomes locked. Meanwhile, the peak of the gain of the wheel speed in the resonant frequency suddenly decreases immediately before the peak value of $\mu$.

The relationship in the magnitude among the respective items of inertia is as follows:

$$J_t < J_w < J_v \tag{10}$$

Hence, $$f_1 < f_2 \tag{11}$$

In other words, when the tire becomes locked, the resonant frequency of the wheel resonating system shifts toward the high-frequency side. In addition, this change in the resonant frequency occurs suddenly in the vicinity of the peak value of $\mu$.

Even if the model is simplified by ignoring the inertia $J_t$ of the tread 15, variation in the resonant frequency of the wheel resonating system and in the peak of the gain of the wheel speed is sufficient for similar analysis to be applicable.

If the changes in the resonant frequency $f_1$ or the peak of the gain of the wheel speed are observed, and the resonant frequency is kept at a value below the peak value of $\mu$, i.e., a value for allowing the tire to grip, it is possible to prevent tire locking. If a maximum braking force within this range is applied to the wheel, it is possible to effect an optimum braking operation.

Accordingly, in the first aspect of the present invention, the vibration characteristic of the wheel speed is detected by the detecting means, and the mean braking force acting on the wheel is controlled by the controlling means on the basis of the detected vibration characteristic of the wheel speed, such that the coefficient of friction between the tire and the road surface substantially reaches a peak value.

The controlling means for controlling the mean braking force acting on the wheel can be constituted by a braking-force operating means for operation by the driver or automatic operation using computer control or the like and a reducing means for reducing the braking force based on the braking-force operating means when the slip ratio exceeds a value at which the coefficient of friction reaches the peak value of $\mu$. Here, in the case of emergency braking, the controlling means can cause the mean braking force to be applied in such a manner as to allow the coefficient of friction to maintain the peak value of $\mu$ in order to realize a minimum braking distance irrespective of the driver's intention.

The detecting means detects the vibration characteristic of the wheel speed which makes it possible to determine the state of slip. In the vibrating system constituted by the vehicle body, the wheel, and the road surface, the frequency at which the amplitude value of the vibration component of the wheel speed becomes maximum can be regarded as the resonant frequency. Therefore, from a comparison of the amplitude gains of respective frequency components of the braking force acting on the wheel and the wheel speed, a determination can be made of the frequency at which the amplitude gain of the wheel speed with respect to the braking force becomes maximum, and the state of slip can be ascertained from the change in this frequency. Accordingly, the resonant frequency itself may be detected from the frequency transfer characteristic.

In addition, the peak of the amplitude gain of the wheel speed decreases as the coefficient of friction approaches the peak value of $\mu$. Therefore, in a case where the resonant frequency in the state in which the tire is gripping is already known, if the braking force is actuated at the resonant frequency occurring between the wheel and the road surface with the tire in a gripping state, the amplitude gain of the resonant-frequency component in the braking force and the wheel speed decreases during locking, thereby making it possible to determine that the coefficient of friction is approaching the peak value of $\mu$. That is, if the resonant frequency in the state in which the tire is gripping can be known, the state of slip can also be determined from the amplitude gain of this resonant-frequency component in the braking force and the wheel speed. Therefore, the amplitude gain of the resonant-frequency component in the braking force and the wheel speed may be detected. Alternatively, after the amplitude of the resonant-frequency component of the wheel speed is detected, the excitation of an exciting means may be adjusted such that the fluctuation of the amplitude assumes a predetermined value, and the amplitude gain of the resonant-frequency component in the braking force and the wheel speed may be calculated from the amplitude of the very small excitation of the braking force at that time.

For this reason, in the first aspect of the present invention, the actuating means may be further provided for causing the braking force acting on the wheel to be actuated by a very small amount at a predetermined frequency.

In the second aspect of the present invention, the resonant frequency is detected by the resonant-frequency detecting means from a frequency distribution of the wheel speed, and control is provided by the controlling means such that the mean braking force acting on the wheel is reduced when the resonant frequency is greater than a reference value.

In the third aspect of the present invention, the braking force acting on the wheel is actuated by a very small amount by the actuating means at a resonant frequency of the vibrating system constituted by the vehicle body, the wheel, and the road surface, and the amplitude of a resonant-frequency component of the wheel speed is detected by the detecting means. The controlling means effects control in such a manner as to reduce the mean braking force acting on the wheel when a gain in the amplitude of the resonant-frequency component of the wheel speed with respect to an amplitude of the very small excitation of the braking force is smaller than a reference value.

In the fourth aspect of the present invention, the braking force acting on the wheel is actuated by a very small amount at the resonant frequency of the vibrating system constituted by the vehicle body, the wheel, and the road surface and at a fixed amplitude, the amplitude of the resonant-frequency component of the wheel speed is detected, and the resonant frequency is detected from a frequency distribution of vibration component of the wheel speed. Then, controlling means reduces the mean braking force acting on the wheel when the detected amplitude of the resonant-frequency component of the wheel speed is smaller than a reference value.

In the fifth aspect of the present invention, the braking force acting on the wheel is actuated by a very small amount at the resonant frequency of the vibrating system constituted by the vehicle body, the wheel, and the road surface and at a fixed amplitude, and the amplitude of the resonant-frequency component of the wheel speed is detected. The amplitude command is determined such that the detected amplitude of the resonant-frequency component of the wheel speed becomes a reference value, and control is provided in such a manner as to reduce the mean braking force acting on the wheel when the amplitude command is greater than a reference amplitude value.

In the sixth aspect of the present invention, the braking force acting on the wheel is excited by a very small amount at the resonant frequency of the vibrating system constituted by the vehicle body, the wheel, and the road surface, and the wheel speed is detected. Control is provided in such a manner as to reduce the mean braking force acting on the wheel when the frequency at which a gain in the amplitude of the wheel speed with respect to an amplitude of the very small excitation of the braking force becomes maximum is greater than a reference value.

In addition, the amplitude of the resonant-frequency component of the wheel speed detected in the fourth aspect of the present invention shows a tendency of changing in dependence on the vehicle speed or a physical amount related to the vehicle speed such as the wheel speed.

Accordingly, in the fourth aspect of the present invention, the vehicle speed or a physical amount related to the vehicle speed may be detected by the physical-quantity detecting means, and the reference value in the fourth aspect of the present invention may be changed in dependence on the detected vehicle speed or physical amount related to the vehicle speed. Control may then be provided in such a manner as to reduce the mean braking force acting on the wheel when the amplitude of the detected resonant-frequency component of the wheel speed is smaller than the changed reference value. Consequently, it is possible to realize a maximum braking force in the state in which the tire is gripping at each vehicle speed.

In the above-described aspects of the present invention, an estimating unit for estimating the vehicle speed is not required, and it is unnecessary to use the acceleration of the vehicle body, so that the controlling apparatus and the sensor can be simplified.

As described above, in accordance with the present invention, since the anti-lock braking operation is carried out by detecting changes in the vibration characteristic of the wheel speed without estimating the vehicle speed, there is an advantage in that it is possible to effect a stable anti-lock braking operation by preventing tire locking while maintaining the resonant frequency of the wheel resonating system at a value persisting when the tire is gripping.

The above and other objects, features and advantages of the present invention will become more apparent from the following detailed description of the invention when read in conjunction with the accompanying drawings.

BRIEF DESCRIPTION OF THE DRAWINGS

FIG. 7 is a conceptual diagram of the ABS controlling apparatus for following the peak value of μ during normal traveling in accordance with the present invention;

FIG. 15 is a diagram illustrating the excitation waveform of the braking force applied to the wheel;

FIG. 17 is a functional block diagram of the ABS controlling apparatus for following the peak value of μ in accordance with a second embodiment of the present invention;

FIG. 25 is a block diagram illustrating an example of the configuration of the slip-state determining unit;

DESCRIPTION OF THE PREFERRED EMBODIMENTS

Figure 1:
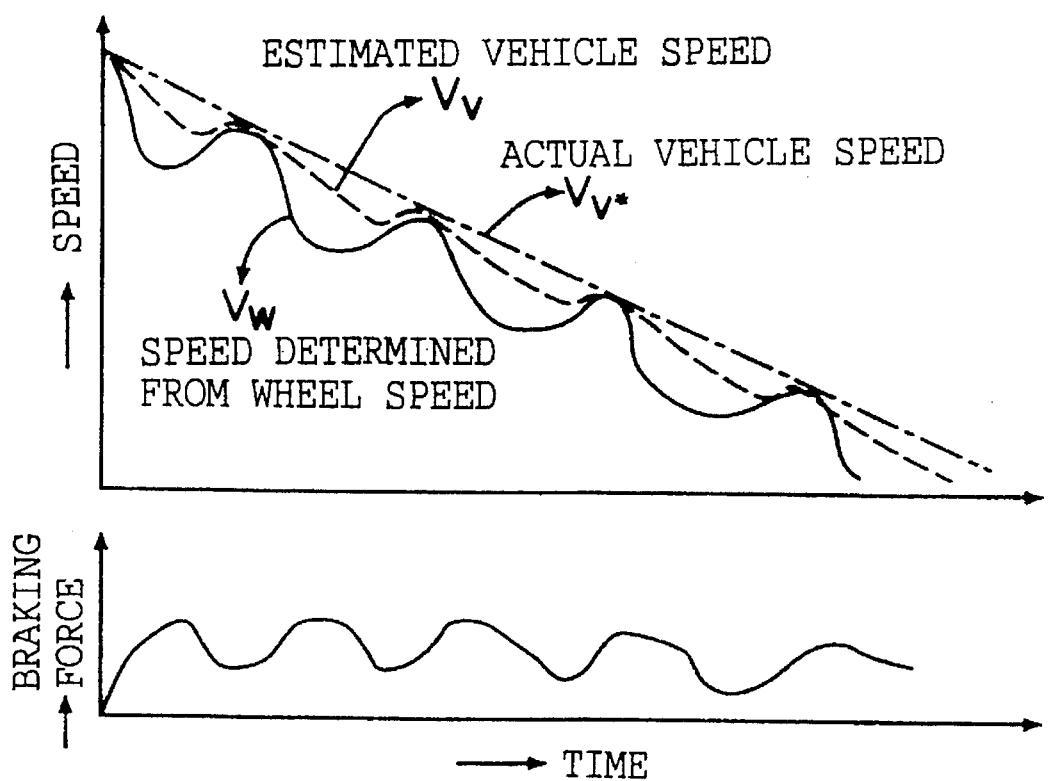
FIG. 1 is a diagram illustrating an outline of a method of estimating the vehicle speed used in a conventional anti-lock brake controlling apparatus.
Figure 2:
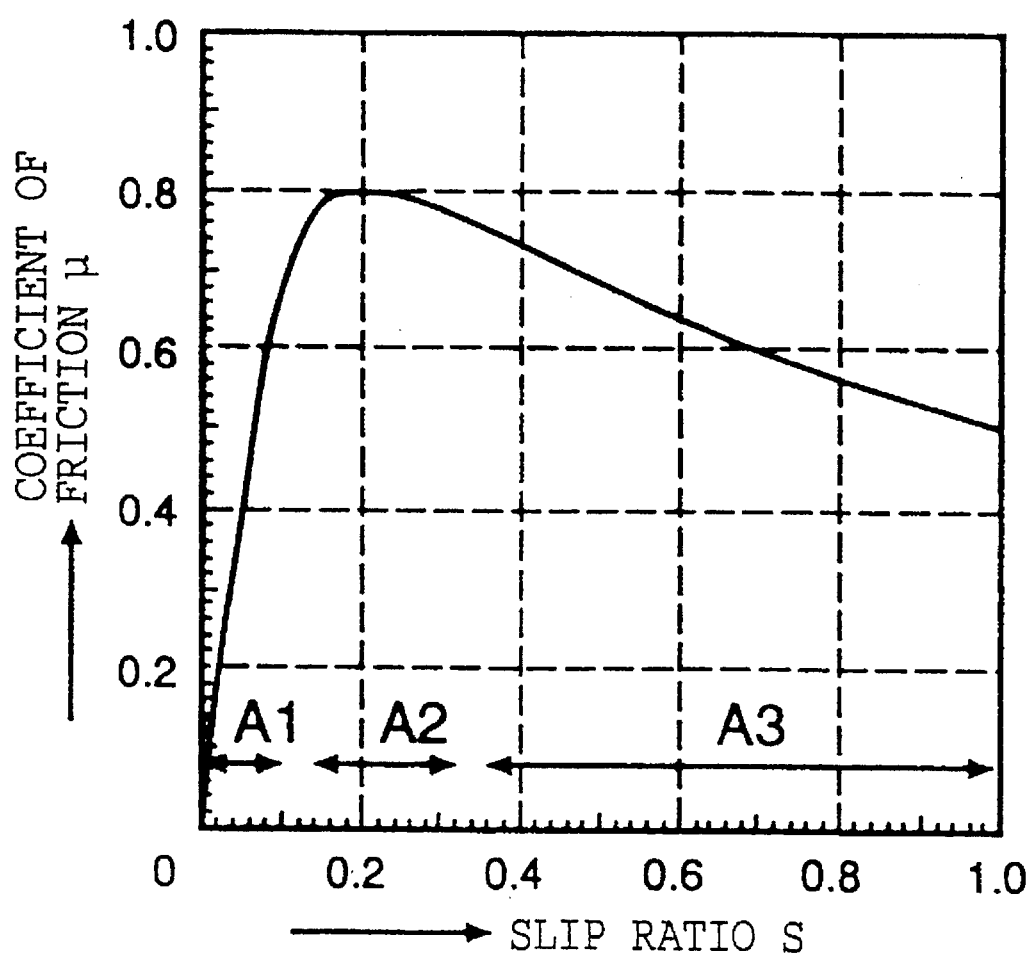
FIG. 2 is a diagram illustrating a characteristic of a coefficient of friction μ between the tire and the road surface with respect to a slip ratio S.
Figure 3:
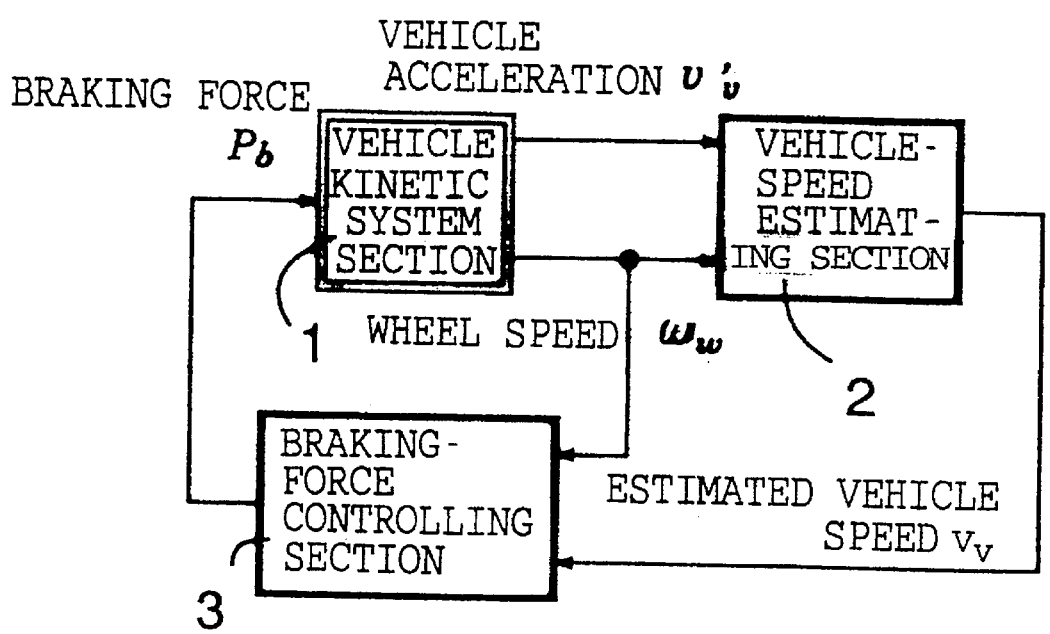
FIG. 3 is a block diagram of a conventional ABS controlling apparatus using a vehicle-speed estimating unit.
Figure 4:
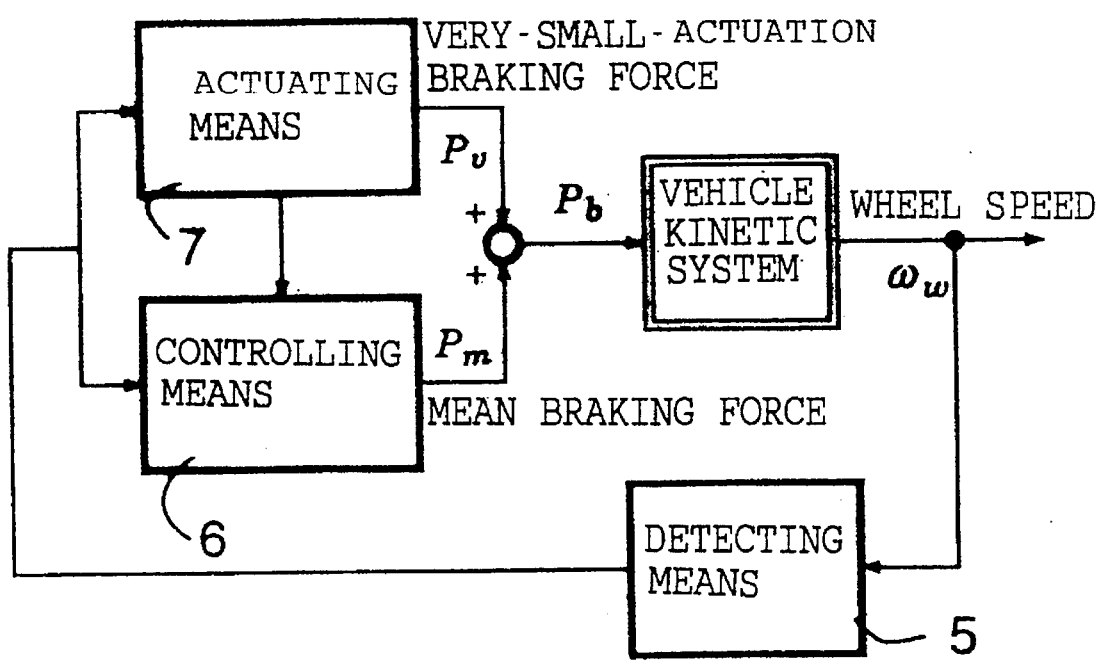
FIG. 4 is a block diagram of an ABS controlling apparatus for following a peak value of μ in accordance with the present invention.
Figure 5:
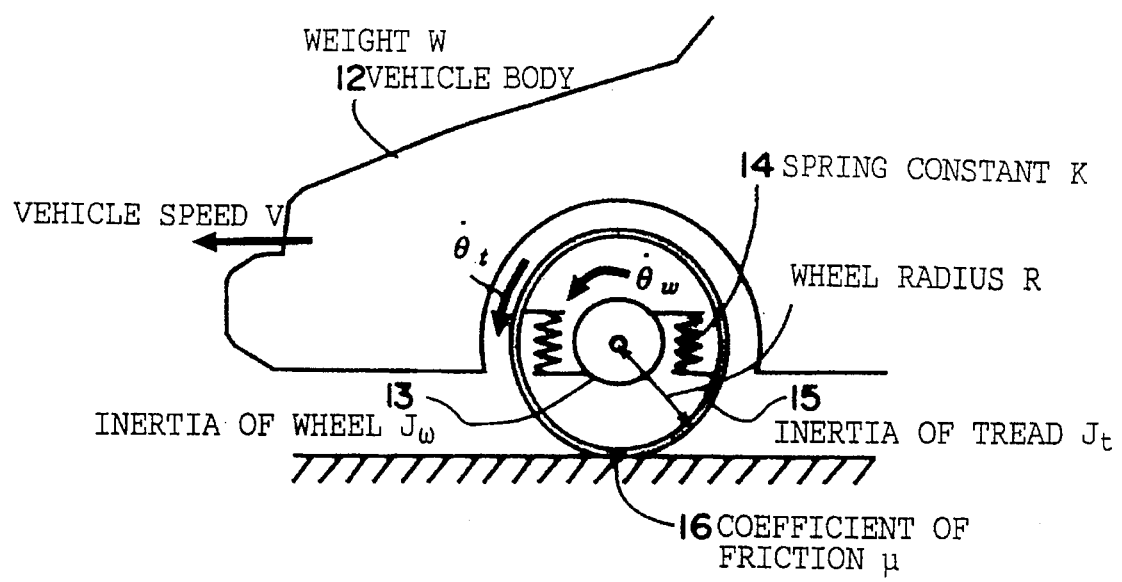
FIG. 5 is a diagram illustrating a dynamic model of a vehicle.
Figure 6:
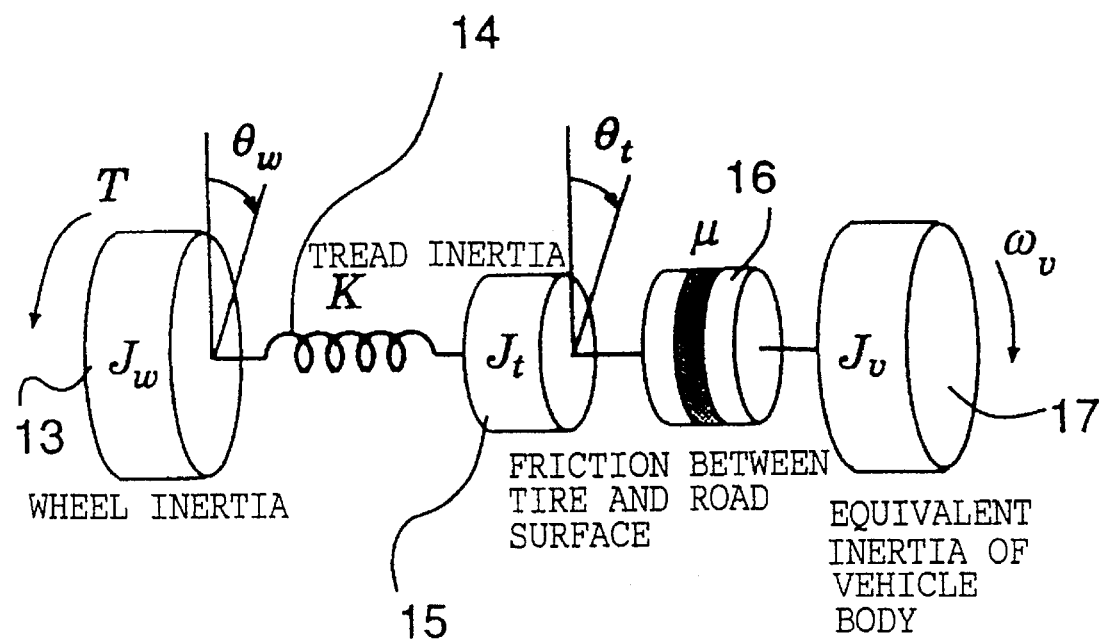
FIG. 6 is a diagram illustrating a model in which the dynamic model of a vehicle is calculated on an axis of rotation.

Referring now to the accompanying drawings, a detailed description will be given of the embodiments of the present invention.

As shown in FIG. 7, an anti-lock brake controlling apparatus (ABS), which is intended for use during ordinary running in accordance with each embodiment which is described below, is comprised of: a control section C for controlling a braking force applied to a wheel, by controlling a vehicle kinetic system 22; and a detecting section 20 for detecting the resonance characteristic of the wheel speed when a very small vibrational braking force is added to the braking force-operated from a driver's operating section 24 including a brake pedal 34 operated by the driver.

The control section C includes a braking-force actuating unit 19 for imparting the very small vibration to the braking force operated from the driver's operating section 24 and a braking-force reducing unit 21 for suppressing an increase in the braking force on the basis of the resonance characteristic of the wheel speed detected by the detecting section 20.

The detecting section 20 can be comprised of a wheel speed sensor for detecting the wheel speed and an amplitude detecting means for detecting the amplitude of the resonant-frequency component of the wheel speed, or a wheel speed sensor for detecting the wheel speed and an extracting means for extracting a frequency at which a gain in the amplitude of the resonant-frequency component of the wheel speed with respect to the amplitude of the very small actuation of the braking force becomes maximum.

First Embodiment

Figure 8:
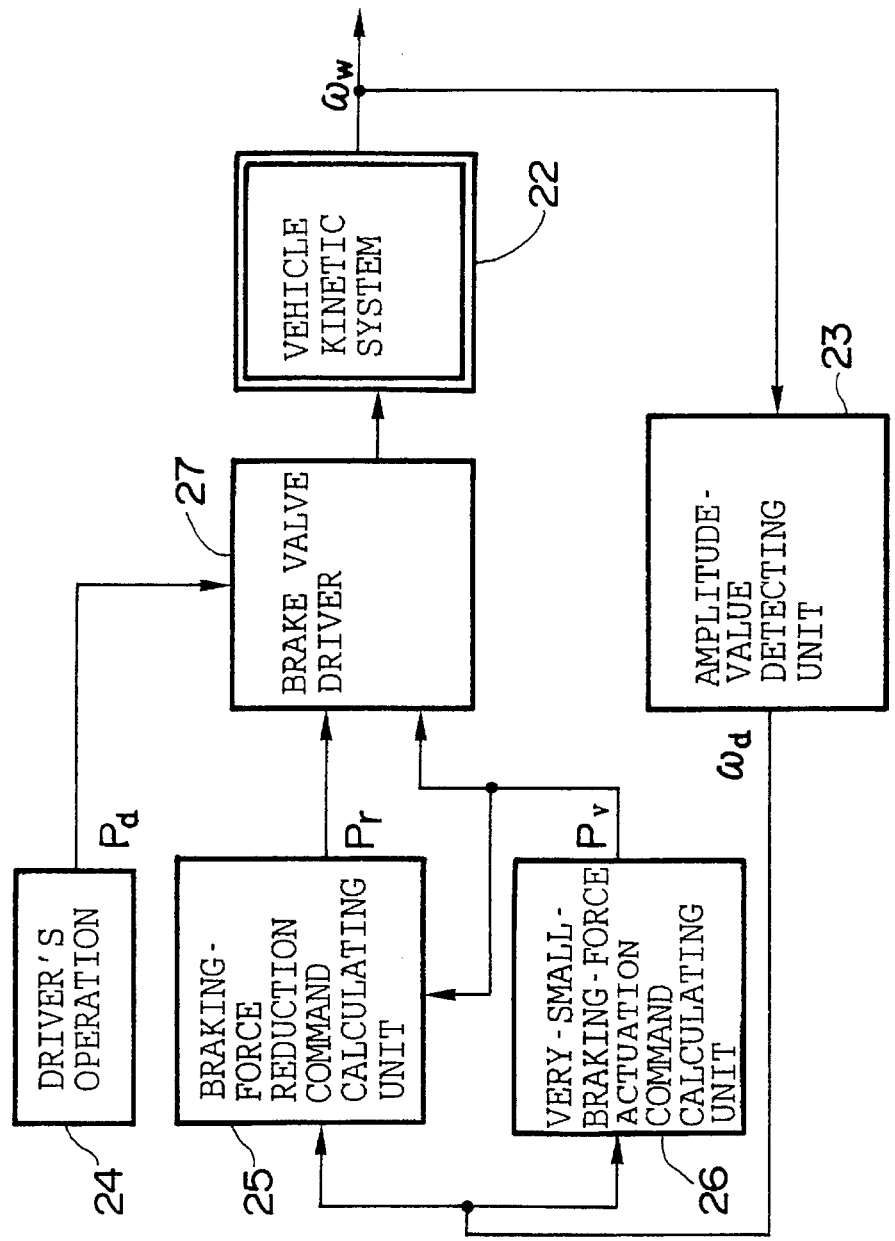
FIG. 8 is a block diagram of the ABS controlling apparatus for following the peak value of μ in accordance with a first embodiment of the present invention.

Next, a description will be given of the ABS in accordance with a first embodiment with reference to FIG. 8. The detecting section 20 is comprised of a wheel speed sensor for detecting a wheel speed $\omega_w$ and an amplitude-value detecting unit 23 connected to the wheel speed sensor to detect an amplitude value of the resonant-frequency component of the wheel speed $\omega_w$. This wheel speed sensor is mounted on the vehicle kinetic system 22 to be controlled, and outputs an a.c. signal proportional to the wheel speed $\omega_w$.

The braking-force actuating unit 19 of the control section C is constituted by a very-small-braking-force excitation command calculating unit 26 for calculating $P_v$, i.e., an amplitude value of a very small amplitude of a brake command $P_b$, on the basis of a detected value $\omega_d$ from the amplitude-value detecting unit 23. The braking-force reducing unit 21 is constituted by a braking-force reduction command calculating unit 25 for calculating a braking-force reduction command $P_r$ on the basis of the detected value $\omega_d$ from the amplitude-value detecting unit 23 and the very-small-braking-force amplitude command $P_v$ from the very-small-braking-force actuation command calculating unit 26.

The braking-force reduction command calculating unit 25 and the very-small-braking-force actuation command calculating unit 26 are connected to a brake valve driver 27 which generates a braking-force command, which is an input to the vehicle kinetic system 22 subject to control, on the basis of the braking-force reduction command $P_r$ from the braking-force reduction command calculating unit 25, a braking force $P_d$ operated from the driver's operating section 24, and the very-small-braking-force actuation amplitude command $P_v$ from the very-small-braking-force actuation command calculating unit 26, and applies this braking-force command to the vehicle kinetic system 22.

Figure 9:
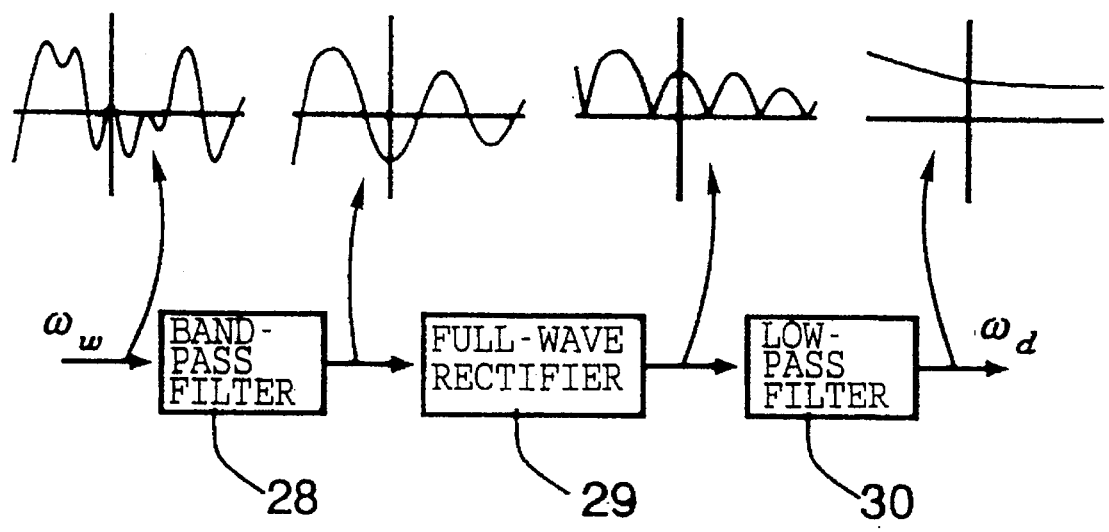
FIG. 9 is a block diagram illustrating an example of the configuration of a slip-state determining unit.

As shown in FIG. 9, the amplitude-value detecting unit 23 is comprised of: a band-pass filter 28 whose pass band is set to a predetermined range including a resonant frequency $f_1$ of the wheel speed occurring when the tire is gripping; a full-wave rectifier 29 for rectifying an output from the band-pass filter 28; and a low-pass filter 30 for smoothing an output from the full-wave rectifier 29 and converting the a.c. signal into a d.c. signal. Since the amplitude-value detecting unit 23 detects only the resonant frequency $f_1$ component of the wheel speed occurring when the tire is gripping, and converts the resonant frequency $f_1$ component of the wheel speed, the detected value $\omega_d$ from the amplitude-value detecting unit 23 is the amplitude value of the resonant frequency $f_1$ component.

The resonance which occurs between the wheel and the road surface is basically not sustained vibration, but damped vibration. Hence, in the case of excitation due to disturbances such as an uneven road surface, it is difficult to detect the resonant frequency $f_1$ component occurring when the tire is gripping.

Accordingly, in this embodiment, the very-small-braking-force actuation command calculating unit 26 calculates the very-small-amplitude command $P_v$ at the time when the very small vibration having the same frequency as the resonant frequency $f_1$ of the wheel speed with the tire gripping is added to the braking force for which an operation command is given by the driver. By actively adding the very small vibration, which has the same frequency as the resonant frequency $f_1$ of the wheel speed with the tire gripping, to the braking force for which an operation command is given by the driver, a change in the resonant frequency $f_1$ is detected from the amplification characteristic.

Figure 10:
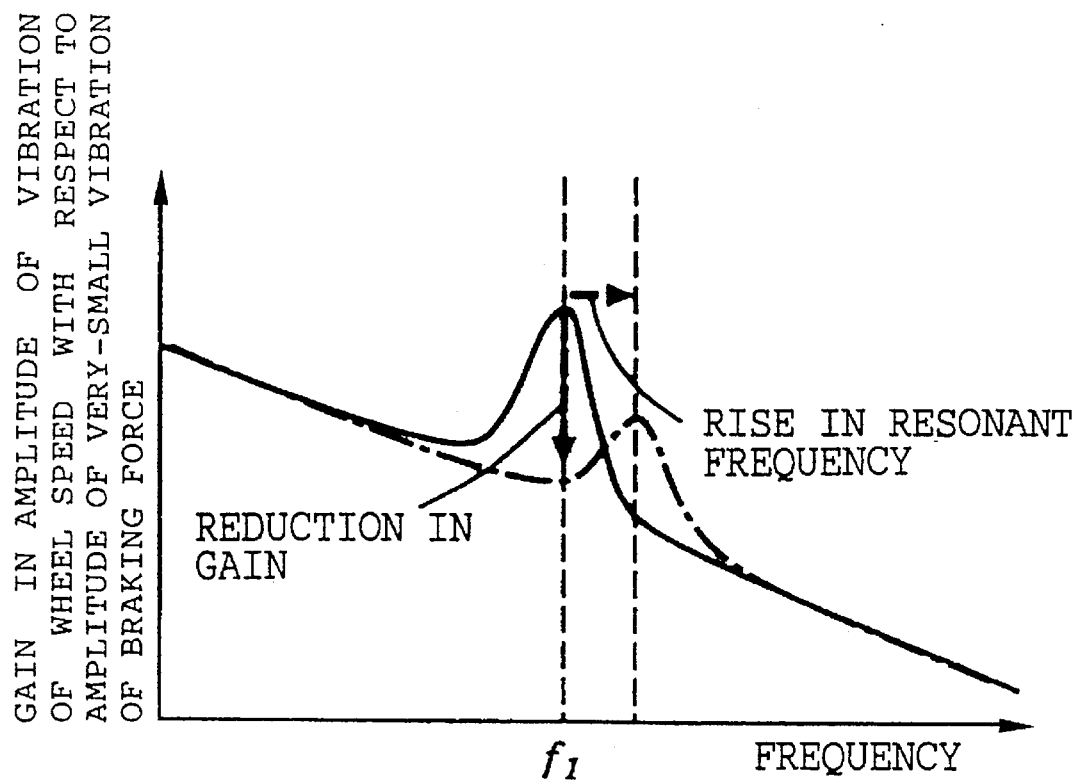
FIG. 10 is a diagram illustrating a rise in the resonant frequency and a decline in the gain of the resonant-frequency component when the tire is gripping.

As shown in FIG. 10, as for the frequency characteristic of the wheel resonating system, as a coefficient of friction μ approaches a peak value, the peak of the gain of the wheel speed in the resonant frequency becomes low, and if the coefficient of friction μ exceeds the peak value, the resonant frequency shifts toward the higher frequency side than the resonant frequency $f_1$ occurring when the tire is gripping. Referring to the resonant frequency $f_1$ component with the tire gripping, as the coefficient of friction approaches the state of the peak value of μ, a reduction in the amplitude of the resonant frequency $f_1$ component appears. Therefore, it is possible to detect that the coefficient of friction is approaching the state of the peak value of μ on the basis of the gain of the very small vibration component of the resonant frequency $f_1$ which appears in the wheel speed.

Figure 11:
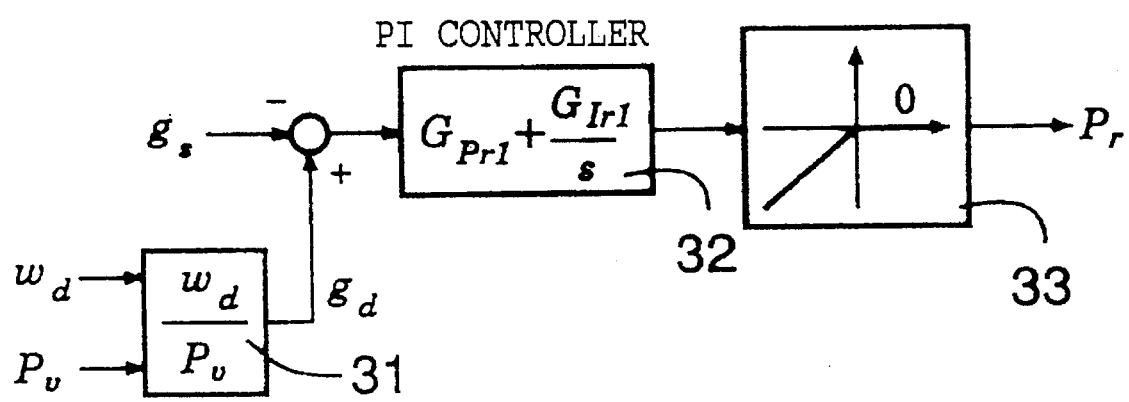
FIG. 11 is a block diagram illustrating an example of the configuration of a braking-force reduction command calculating unit.

Accordingly, in this embodiment, as shown in FIG. 11, the braking-force reduction command calculating unit 25 for controlling the reduction of a mean braking force $P_m$, i.e., an average braking force applied to the wheel, is comprised of: a calculating portion 31 for calculating a very-small-actuation gain $g_d$, i.e., a gain of the detected value $\omega_d$ from the amplitude-value detecting unit 23 with respect to the very-small-braking-force actuation amplitude command $P_v$; a PI controller 32 for calculating a reduced braking force by proportional-integral control using a difference, $g_d$-$g_s$, between the very-small-excitation gain $g_d$ and a reference value $g_s$, a proportional gain $G_{pr1}$, and an integral gain $G_{Ir1}$; and a positive-value-eliminating portion 33 which eliminates positive values so that a command will not be given by exceeding the braking force $P_d$ operated by the driver, so as to output the braking-force reduction command $P_r$ by adopting only negative values.

If the very-small-actuation gain $g_d$ is greater than the reference value $g_s$, i.e., if the detected value $\omega_d$ when the vibration is excited by the very-small-braking-force excitation amplitude command $P_v$ is greater than the reference value $g_sP_v$ (where $\omega_d$ is a rotational speed and its unit is [rad/s], $P_v$ is pressure or torque and its unit is [Pa] or [Nm]), this braking-force reduction command calculating unit 25 maintains the mean braking force $P_m$ by assuming that the tire is gripping as explained in FIG. 10. To the contrary, if the very-small-excitation gain $g_d$ is smaller than the reference value $g_s$, i.e., if the detected value $\omega_d$ when the vibration is excited by the very-small-braking-force excitation amplitude command $P_v$ is smaller than the reference value $g_sP_v$, it means that the coefficient of friction is approaching the peak value of μ, so that the braking-force reduction command calculating unit 25 reduces the mean braking force $P_m$.

Figure 12:
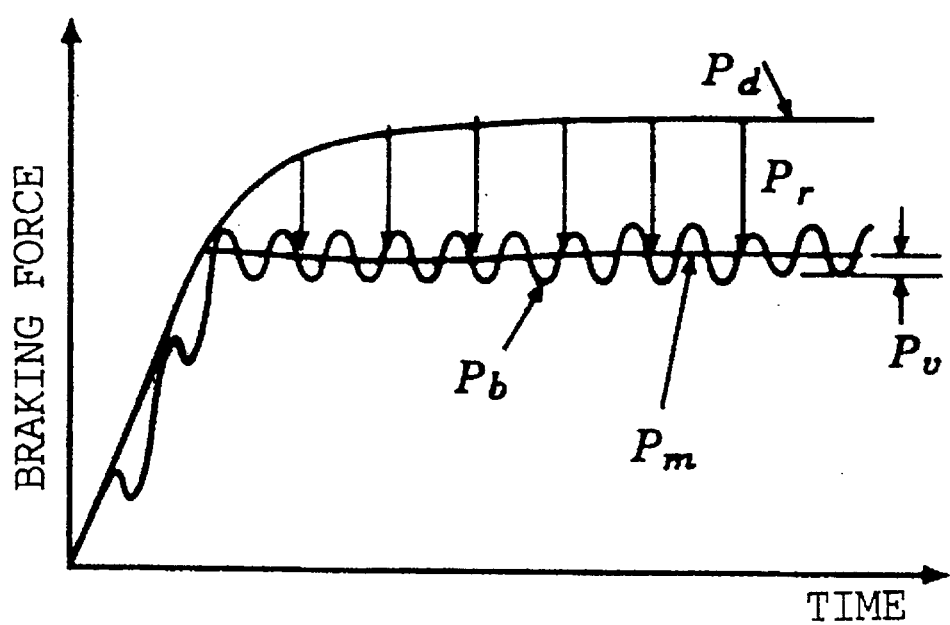
FIG. 12 is a diagram illustrating a waveform profile of the braking force applied to the wheel.

As shown in FIG. 12, the mean braking force $P_m$ is expressed as follows.

$$P_m = P_a + P_r, \quad P_r \leq 0 \tag{12}$$

Since the braking-force reduction command $P_r$ is constantly a negative value, the mean braking force $P_m$ is not commanded by exceeding the braking force $P_d$ operated by the driver. In addition, as the mean braking force $P_m$ is maintained, the braking force applied to the tire increases in correspondence with the pressing force applied by the driver.

Figure 13:
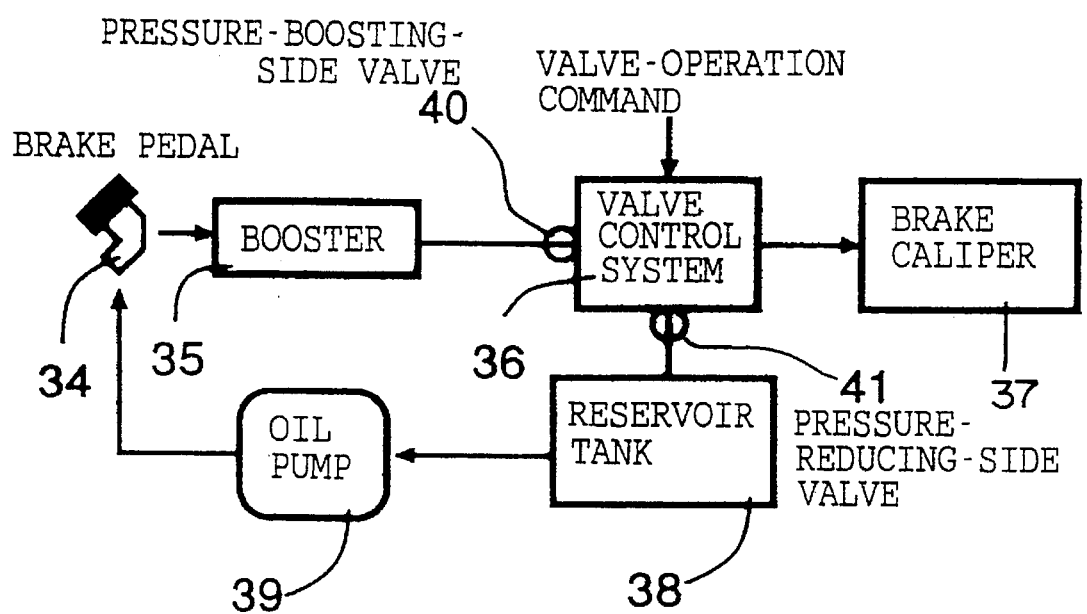
FIG. 13 is a block diagram illustrating the configuration of hardware of a braking section.

The brake valve driver 27 is a portion for converting the command of the mean braking force $P_m$ and the very-small-braking-force excitation amplitude command $P_v$ into an actual braking torque for the wheel. As shown in FIG. 13, the brake valve driver 27 is provided with a booster 35, a valve control system 36, a brake caliper 37, a reservoir tank 38, and an oil pump 39.

The brake pedal 34 is connected to a pressure-boosting-side valve 40 of the valve control system 36 via the booster 35 for intensifying the operating force of the brake pedal 34. A valve operation command is inputted to the valve control system 36, and the valve control system 36 is connected to the brake caliper 37 and is also connected to the reservoir tank 38 via a pressure-reducing-side valve 41.

Figure 14:
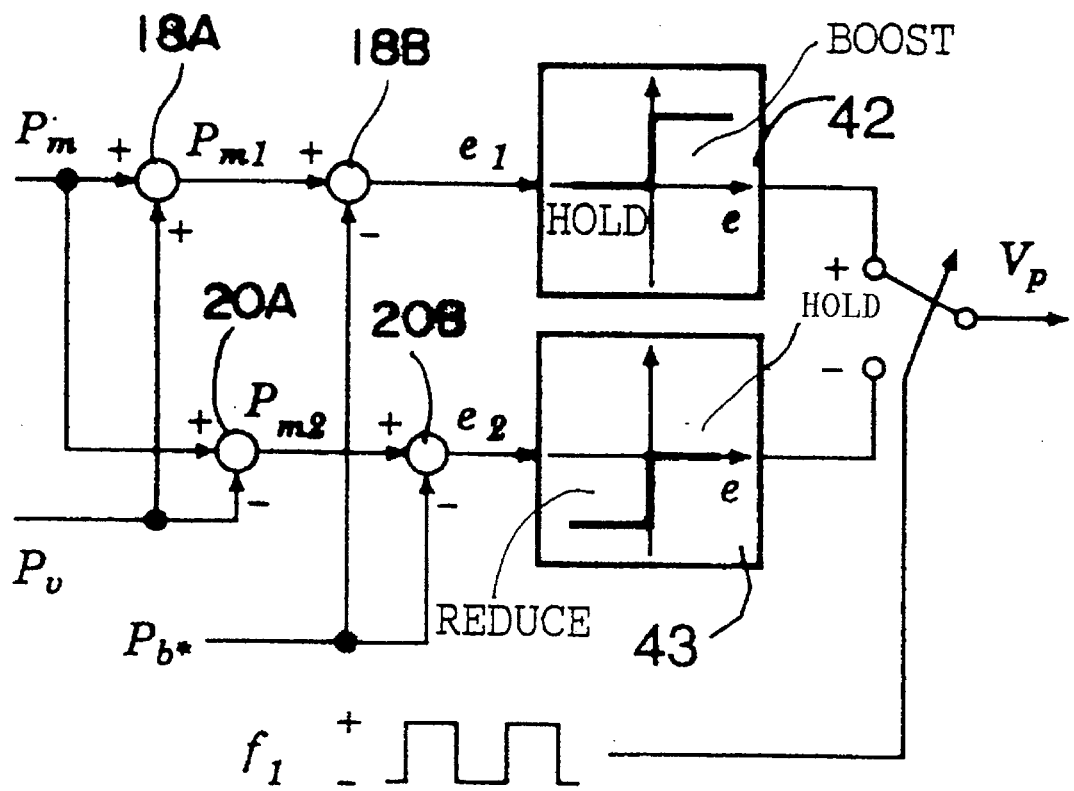
FIG. 14 is a block diagram illustrating a configuration of a valve-command generating circuit.

This valve operation command is generated by the circuit shown in FIG. 14. As shown in FIG. 15, the command of the mean braking force $P_m$ and the very-small-braking-force actuation amplitude command $P_v$ are inputted to the circuit, and the circuit excites the command of the mean braking force $P_m$ with the same excitation frequency as the resonant frequency $f_1$ occurring when the tire is gripping.

The principle of this operation will be described hereafter. First, a calculating portion 18A calculates the sum Pml of the command of the mean braking force $P_m$ and the very-small-braking-force excitation amplitude command $P_v$, and a calculating portion 20A calculates the difference $P_{m2}$ between the command of the mean braking force $P_m$ and the very-small-braking-force excitation amplitude command $P_v$. The sum $P_{m1}$ corresponds to an upper limit of the braking-force command, while the difference $P_{m2}$ corresponds to a lower limit of the braking-force command. By using the sum $P_{m1}$ and the difference $P_{m2}$ as commands, calculating portions 18B and 20B respectively calculate differences e1 and e2 with respect to an actual braking pressure $P_{b*}$, command-generating portions 42 and 43 calculate positions of the valves from the differences e1 and e2 and generate commands. As these commands are changed over by the excitation frequency which is the same frequency as the resonant frequency $f_1$, the braking pressure is excited. However, with respect to the sum $P_{m1}$, commands for only boosting and holding are generated, and, with respect to the difference $P_{m2}$, commands for only holding and pressure reduction are generated. As the commands are thus generated, the excess vibration of the braking-pressure command is prevented, thereby making it possible to effect excitation at the same frequency as the resonant frequency $f_1$.

When boosting the braking hydraulic pressure, the brake valve driver 27 opens the pressure-boosting-side valve 40 on the booster 35 side, and closes the pressure-reducing-side valve 41 of the reservoir tank 38, thereby allowing the booster pressure to be inputted directly to the brake caliper 37. On the other hand, when reducing the braking hydraulic pressure, the brake valve driver 27 closes the pressure-boosting-side valve 40, and opens the pressure-reducing-side valve 41, thereby reducing the pressure within the brake caliper 37 via the oil pump 39. In addition, if the two valves are closed, the braking hydraulic pressure is held, and the braking force is maintained.

In such valve operation, the pressure within the brake caliper 37 does not rise above the braking force due to the operation of the pedal 34 by the driver, and the ABS does not operate at the time of weak braking during normal running. The ABS operates when there is a tendency that brakes are about to be applied in such a way that the braking force due to the operation of the pedal 34 by the driver exceeds the peak value of μ, and a braking operation which follows the peak value of μ can thus be realized.

According to this ABS, if the coefficient of friction reaches the peak value of μ when the braking force constituted by the sum of the braking force operated by the driver and the very-small-vibration braking force is applied to the wheel, the mean braking force is reduced by the braking-force reducing unit 21, and an increase in the braking force exceeding that level is suppressed, thereby preventing the tire from becoming locked.

In contrast, in a braking operation at the time of an emergency in an automatic driving system, a stable braking operation in a minimum braking distance is required irrespective of the driver's intention. As for the braking force applied to the wheel, the mean braking force is increased or reduced such that the coefficient of friction is set in the state of the peak value of μ irrespective of the value based on the operation by the driver, so as to effect a braking operation. Such a braking operation during an emergency is also applicable to a railway train and the like. This holds true of all the other embodiments that are shown below.

Figure 16A:
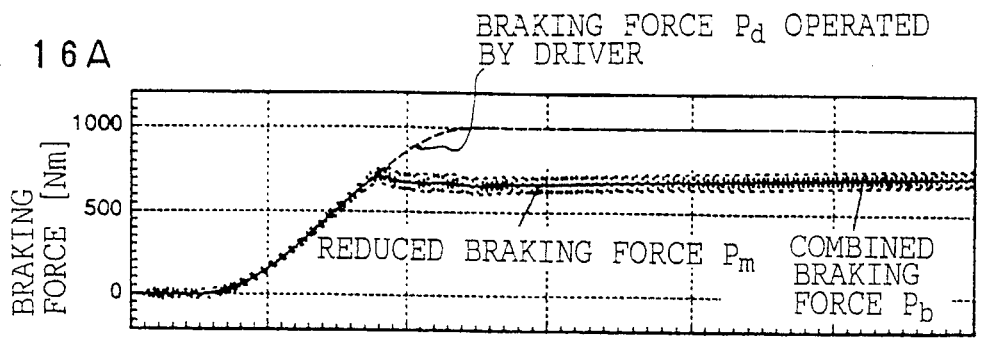
FIG. 16A to FIG. 16D are diagrams illustrating the operation of the controlling system in accordance with the first embodiment.
Figure 16B:
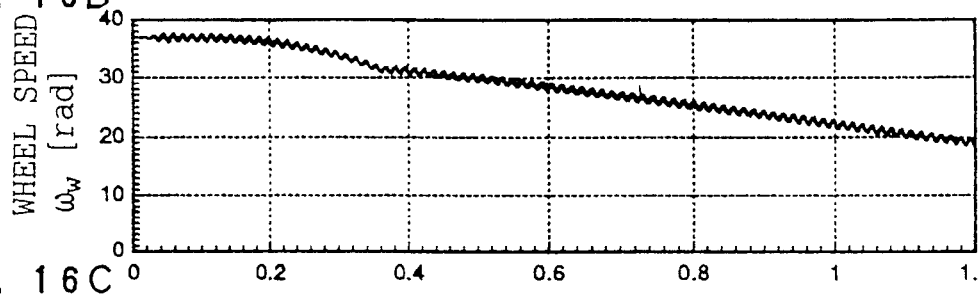
Figure 16C:
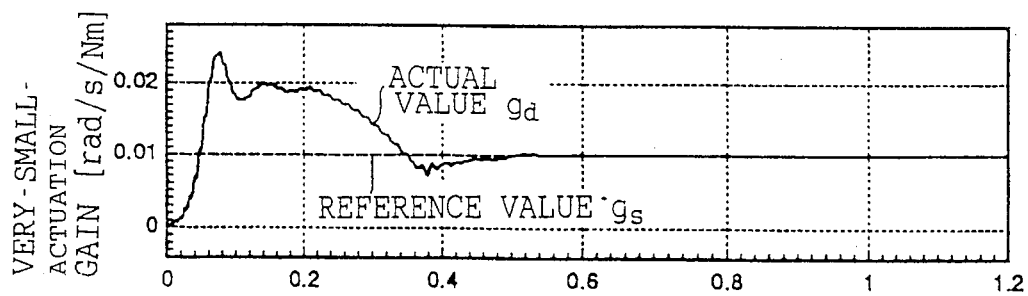
Figure 16D:
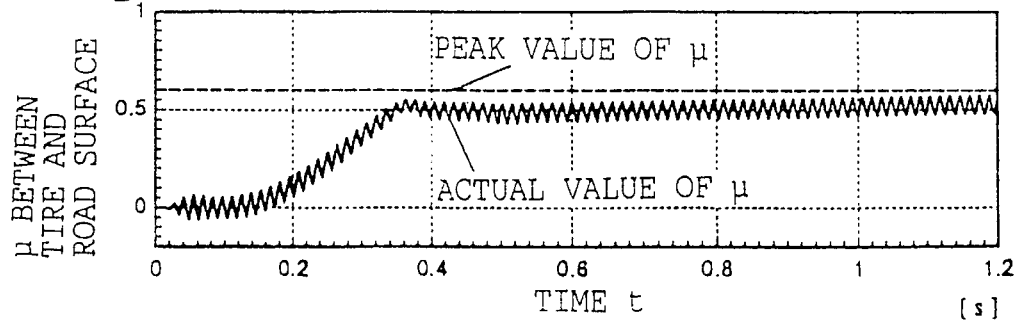

FIGS. 16A to 16D illustrate the operation of each unit of the ABS in accordance with this embodiment. FIG. 16A shows the braking force, FIG. 16B shows the wheel speed, FIG. 16C shows the very-small-excitation gain, and FIG. 16D shows the coefficient of friction. Here, it is assumed that the initial speed of the vehicle is 40 km/h, the peak value of μ is 0.6, the reference very-small-excitation gain $g_s$ is 0.01 rad/s/Nm.

The excitation of the braking force is started simultaneously with the operation by the driver, and if the very-small-excitation gain $g_d$ is greater than or equal to the reference value $g_s$, the braking force $P_d$ operated by the driver is directly applied to the wheel. If the detected very-small-excitation gain $g_d$ is below the reference value $g_s$, the mean braking force $P_m$ is reduced by the braking-force reducing unit 21. Consequently, it can be seen that the coefficient of friction μ between the tire and the road surface is fixed to the vicinity of the peak without causing wheel locking.

This embodiment is basically realized by using a modified form of the existing ABS, and can be realized by merely changing the method of operating the brake valves. This facilitates a change from the existing ABS system. In addition, since the estimation of the vehicle speed is not required, a gravity (G) sensor or the like for detecting the acceleration or deceleration of the vehicle body is not required, so that hardware can be simplified. Furthermore, since the frequency of the braking-force excitation is 40 Hz or thereabouts and has a very small excitation amplitude, the apparatus can be realized without imparting discomfort to the vehicle occupant.

Second Embodiment

Next, a description will be given of a second embodiment. In this embodiment, the present invention is applied to a case in which the amplitude of the very small braking force which is an input can be held in a fixed state. As shown in FIG. 17, the anti-lock brake controlling apparatus in this embodiment is comprised of: a very-small-braking-force excitation command calculating unit 44 for outputting the fixed very-small-braking-force actuation amplitude command $P_v$; and a braking-force reduction command calculating unit 45 for calculating the braking-force reduction command $P_r$ on the basis of only the detected value $\omega_d$ from the amplitude-value detecting unit 23, which is an amplitude of the resonant-frequency component of the wheel speed vibration. Incidentally, the frequency of the very small excitation in this embodiment is the resonant frequency of the wheel resonating system in the same way as in the first embodiment.

Figure 18:
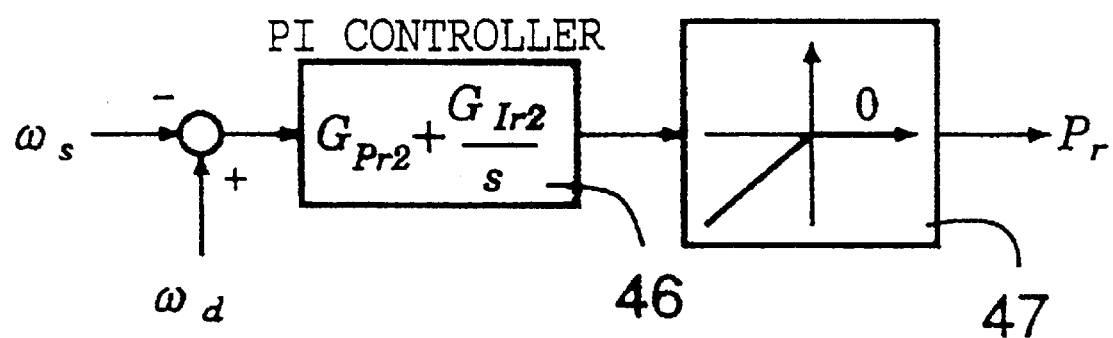
FIG. 18 is a block diagram illustrating an example of the configuration of a braking-force reduction command calculating unit.

As shown in FIG. 18, this braking-force reduction command calculating unit 45 is comprised of: a calculating device for calculating the difference, $\omega_s-\omega_d$, between the reference value $\omega_s$ and the value detected by the amplitude-value detecting unit 23, i.e., the amplitude $\omega_d$ of the resonant-frequency component; a PI controller 46 for effecting proportional-integral control using a proportional gain $G_{Pr2}$ and an integral gain $G_{Ir2}$; and a positive-value eliminating portion 47 which eliminates positive values so that a command will not be given by exceeding the braking force $P_d$ operated by the driver.

In this embodiment, if the output from the amplitude-value detecting unit 23, i.e., the amplitude $\omega_d$ of the resonant-frequency component, is greater than the reference value $\omega_s$, it is assumed that the tire is gripping, so that the braking-force reduction command $P_r$ is maintained so as to maintain the mean braking force $P_m$. On the other hand, if the amplitude $\omega_d$ of the resonant-frequency component is smaller than the reference value $\omega_s$, it is assumed that the tire is close to a locked state, so that the braking-force reduction command $P_r$ is reduced so as to reduce the mean braking force $P_m$.

This embodiment is also basically realized by using a modified form of the existing ABS, and can be realized by merely changing the method of operating the brake valves. In this embodiment, since it is unnecessary to calculate the gain in the amplitude of the resonant-frequency component of the wheel speed with respect to the amplitude of the braking force due to the very small excitation, it is possible to simplify the ABS.

Third Embodiment

Figure 19:
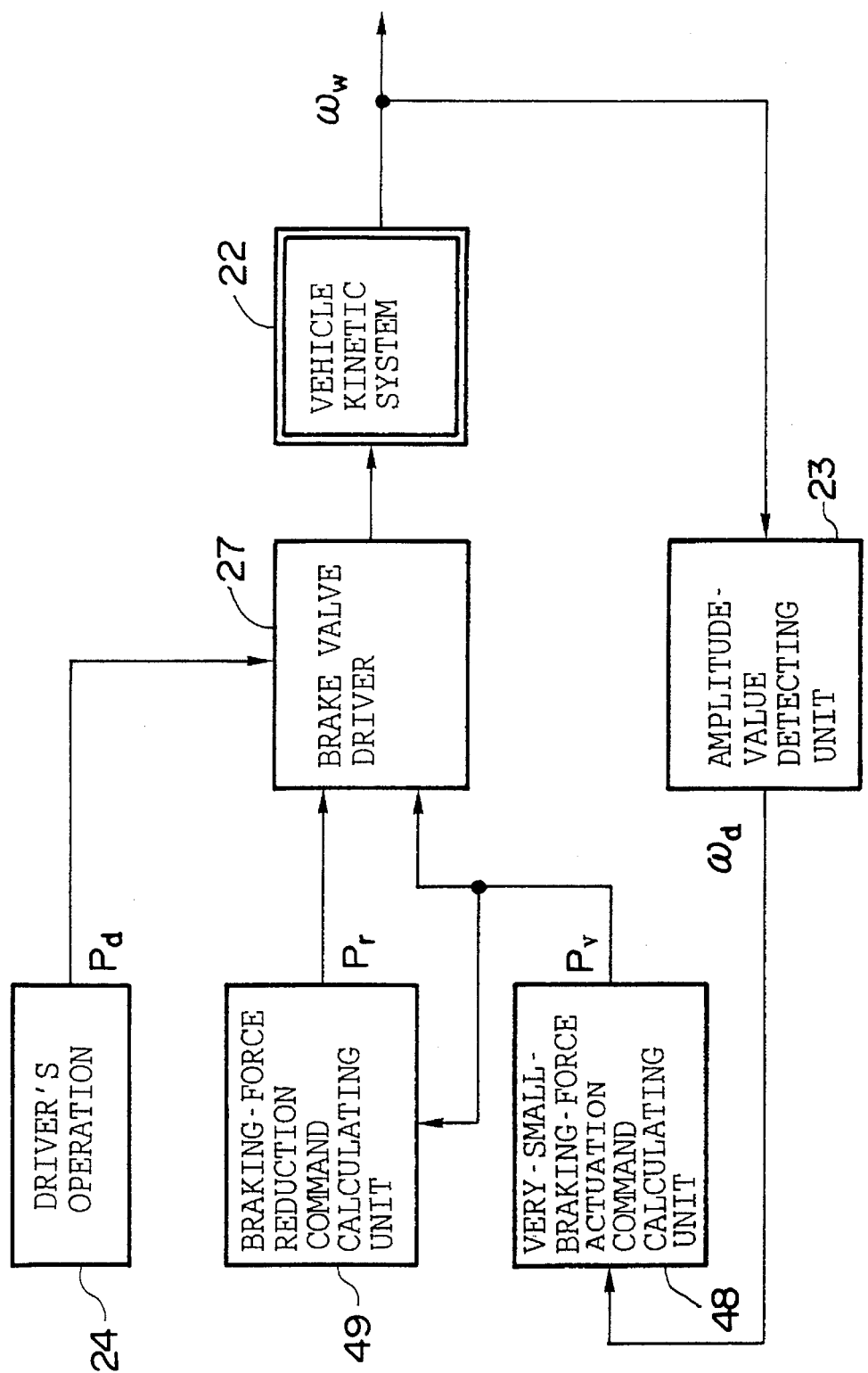
FIG. 19 is a block diagram of the ABS controlling apparatus for following the peak value of μ in accordance with a third embodiment of the present invention.

A description will now be given of a third embodiment. In this embodiment, the amplitude of very small vibrations appearing in the wheel speed is made constant by controlling the very small braking force added to the mean braking force. As shown in FIG. 19, the anti-lock brake controlling apparatus in this embodiment is comprised of: a very-small-braking-force actuation command calculating unit 48 for outputting the very-small-braking-force actuation amplitude command $P_v$ on the basis of the detected value $\omega_d$ from the amplitude-value detecting unit 23, which is the amplitude of the resonant-frequency component of the wheel speed; and a braking-force reduction command calculating unit 49 for calculating the braking-force reduction command $P_r$ on the basis of the very-small-braking-force excitation amplitude command $P_v$.

Figure 20:
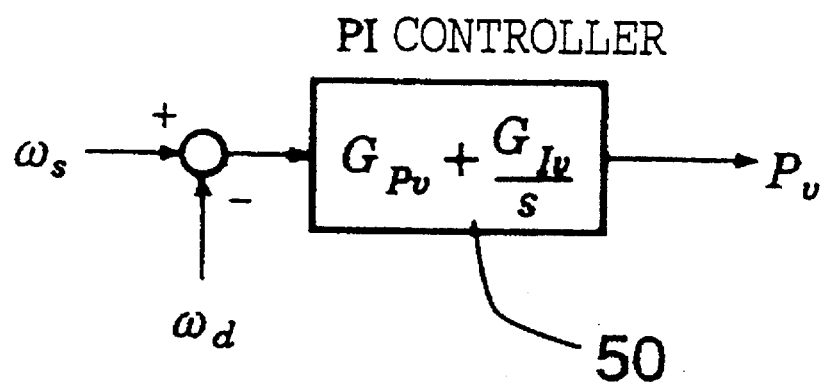
FIG. 20 is a block diagram illustrating an example of the configuration of a very-small-braking-force actuation command calculating unit.

As shown in FIG. 20, this very-small-braking-force actuation command calculating unit 48 is comprised of: a calculating device for calculating the difference, $\omega_s-\omega_d$, between the reference value $\omega_s$ and an output from the amplitude-value detecting unit 23, i.e., the amplitude $\omega_d$ of the resonant-frequency component; and a PI controller 50 for effecting proportional-integral control using a proportional gain $G_{Pv}$ and an integral gain $G_{Iv}$.

Figure 21:
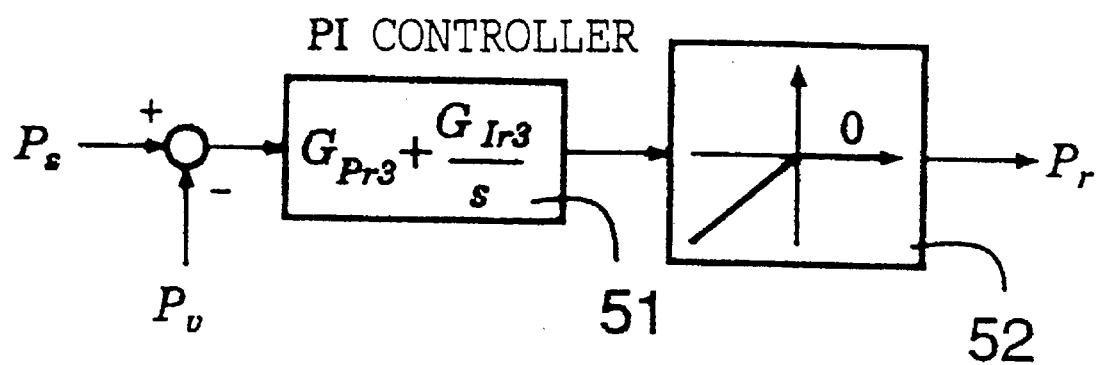
FIG. 21 is a block diagram illustrating an example of the configuration of the braking-force reduction command calculating unit.

As shown in FIG. 21, this braking-force reduction command calculating unit 49 is comprised of: a calculating device for calculating the difference, $P_s-P_v$, between a very-small-braking-force reference amplitude value $P_s$ and the very-small-braking-force actuation amplitude command $P_v$; a PI controller 51 for effecting proportional-integral control using a proportional gain $G_{Pr3}$ and an integral gain $G_{Ir3}$; and a positive-value eliminating portion 52 which eliminates positive values so that a command will not be given by exceeding the braking force $P_d$ operated by the driver.

In this embodiment, the difference, $\omega_s-\omega_d$, between the reference value $\omega_s$ and the amplitude $\omega_d$ of the resonant-frequency component of the wheel speed is fed back to generate the very-small-braking-force actuation amplitude command $P_v$. Namely, if the amplitude $\omega_d$ is smaller than the reference value $\omega_s$, the very-small-braking-force actuation amplitude command $P_v$ is made large, while if the amplitude $\omega_d$ is greater than the reference value $\omega_s$, the very-small-braking-force actuation amplitude command $P_v$ is made small, thereby controlling the amplitude value $\omega_d$ of the actuated-frequency component appearing in the wheel speed to a very small fixed reference value $\omega_s$. By providing such control, it is possible to effect actuation in the range in which the vibrations cannot be felt by the driver of the vehicle.

Thus, in this embodiment, since the very-small-braking-force actuation amplitude command $P_v$ is controlled in such a manner as to set the amplitude $\omega_d$ of the very small vibrations appearing in the wheel speed to a fixed level, the deviation of a resonance point due to the approach to the peak value of μ appears as an increase of the actuation amplitude command $P_v$ of the braking force which is the input.

Accordingly, if the difference from the fixed very-small-braking-force reference amplitude value $P_s$ is fed back, and control is provided such that the mean braking force $P_m$ is reduced when the actuation amplitude command $P_v$ of the braking force is greater than the very-small-braking-force reference amplitude value $P_s$, and the mean braking force $P_m$ is increased when the actuation amplitude command $P_v$ of the braking force is smaller than the very-small-braking-force reference amplitude value $P_s$, thereby effecting a braking operation which follows the peak value of μ.

This embodiment is also basically realized by using a modified form of the existing ABS, and can be realized by merely changing the method of operating the brake valves. In this embodiment as well, since it is unnecessary to calculate the gain in the amplitude of the wheel speed with respect to the amplitude of the braking force due to the very small excitation, it is possible to simplify the controlling apparatus. In addition, since the very small vibration appearing in the wheel speed can be made a sufficiently small value, it is possible to effect excitation in the range in which the vibrations cannot be felt by the driver, thereby preventing uncomfortable vibrations.

Fourth Embodiment

In the above embodiments, the resonance characteristic is determined from the change in the amplitude of the resonant frequency $f_1$ component of the wheel speed when the tire is gripping. In the fourth embodiment, the resonant frequency itself is observed from the frequency transfer characteristic so as to control the mean braking force through the change in the resonant frequency itself.

Figure 22:
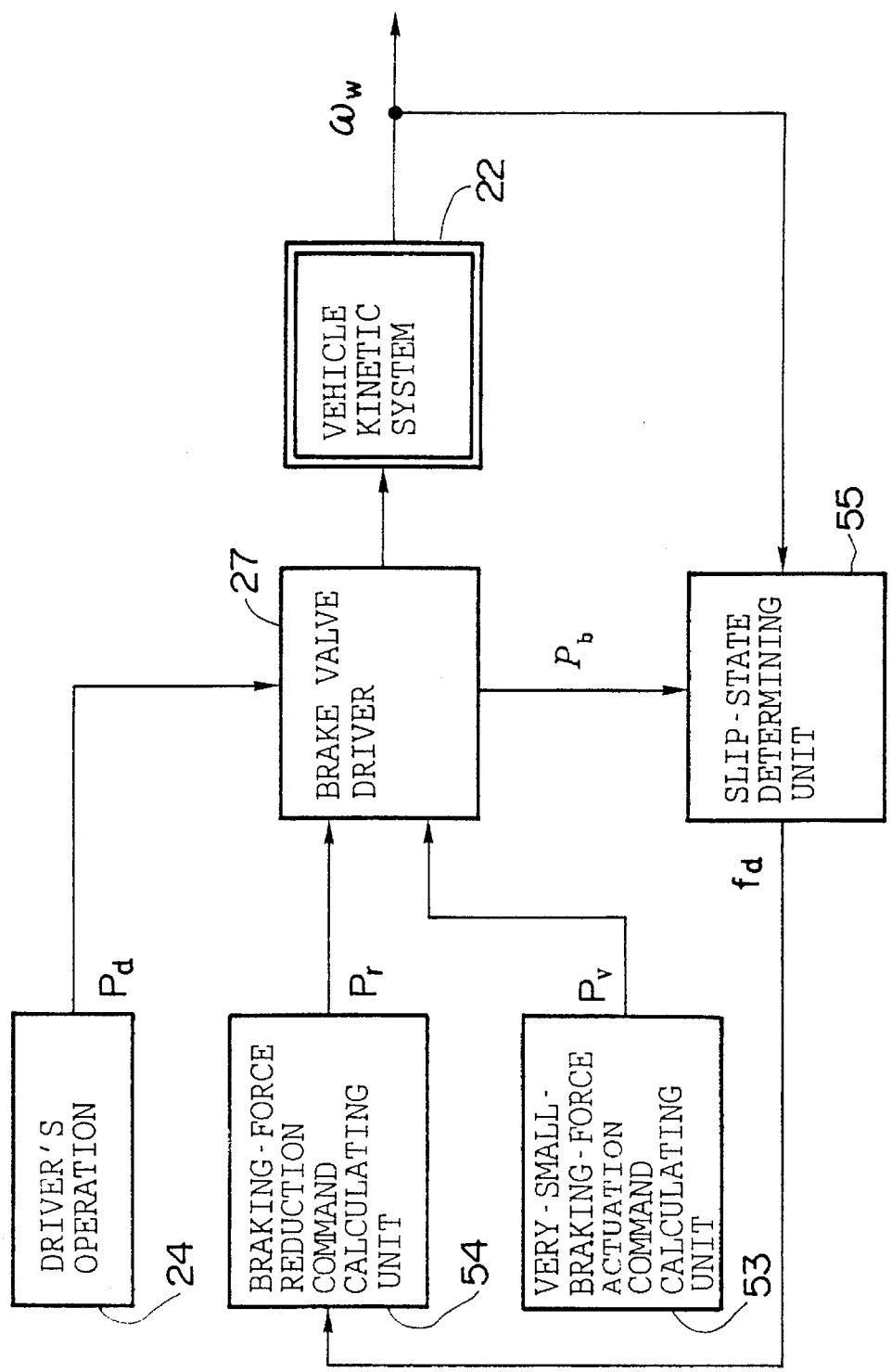
FIG. 22 is a block diagram of the ABS controlling apparatus for following the peak value of μ in accordance with a fourth embodiment of the present invention.

As shown in FIG. 22, the anti-lock brake controlling apparatus in this embodiment is comprised of: a very-small-braking-force actuation command calculating unit 53 for calculating the very-small-braking-force actuation amplitude command $P_v$; a slip-state determining unit 55 for calculating a resonant frequency $f_d$ exhibiting a maximum gain on the basis of the braking force $P_b$ and the wheel speed $\omega_w$; and a braking-force reduction command calculating unit 54 for calculating the braking-force reduction command $P_r$ on the basis of the resonant frequency $f_d$ exhibiting a maximum gain.

Figure 23:
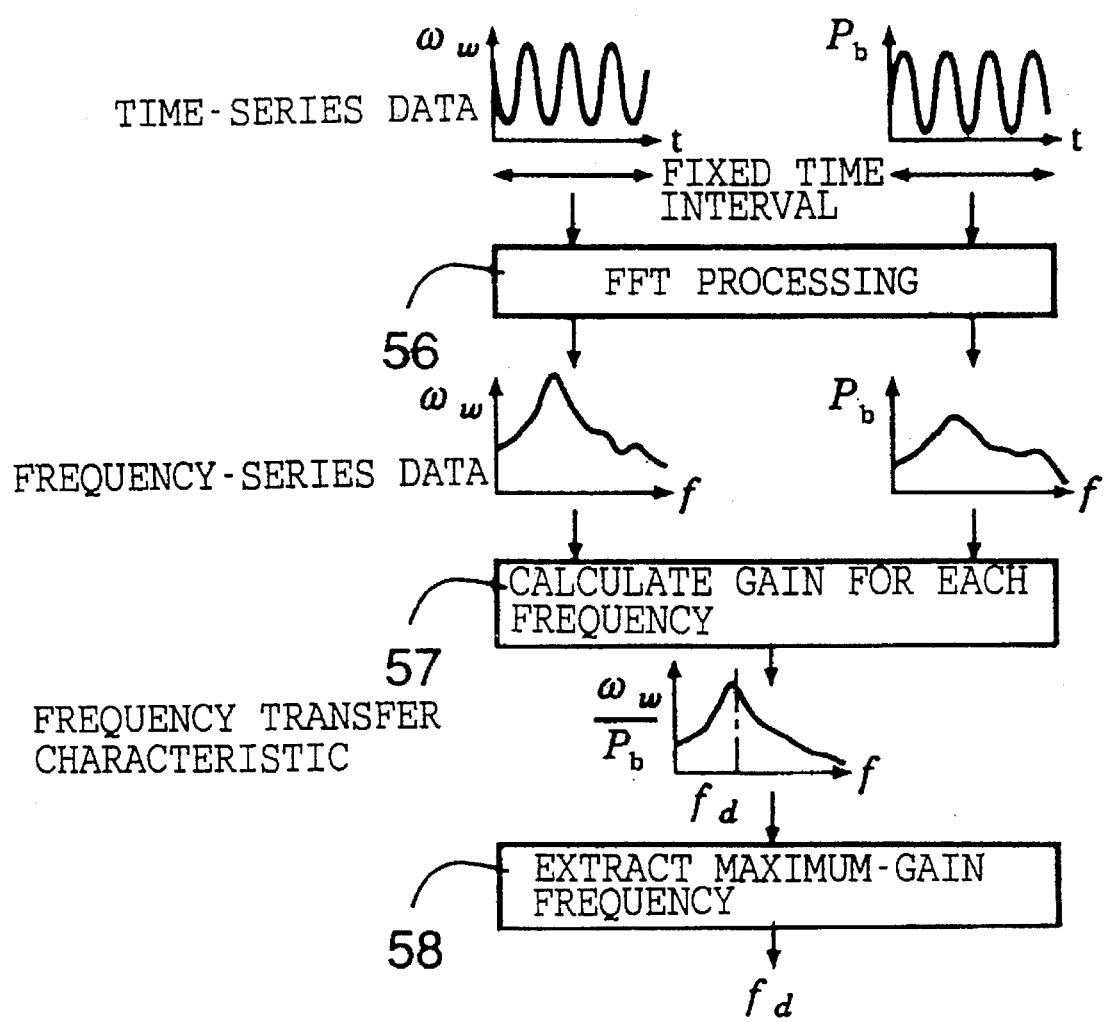
FIG. 23 is a block diagram illustrating an example of the configuration of the slip-state determining unit.

As shown in FIG. 23, the slip-state determining unit 55 is comprised of: an FFT processing portion 56 for performing a fast Fourier transform with respect to data on the wheel speed $\omega_w$ and the braking force $P_b$ persisting for a fixed time interval; a calculating portion 57 for calculating the gain of the wheel speed $\omega_w$ with respect to the braking force $P_b$ for each frequency concerning the obtained frequency-series data; and an extracting portion 58 for extracting the frequency $f_d$ exhibiting a maximum gain by determining the frequency transfer characteristic.

If this slip-state determining unit 55 is used, the braking operation which follows the peak value of μ is carried out by calculating the command on the mean braking force $P_m$ such that the command is increased if the resonant frequency $f_d$ is smaller than the reference value $f_s$, and the command is decreased if the frequency $f_d$ exhibiting a maximum gain is greater than the reference value $f_s$.

Figure 24:
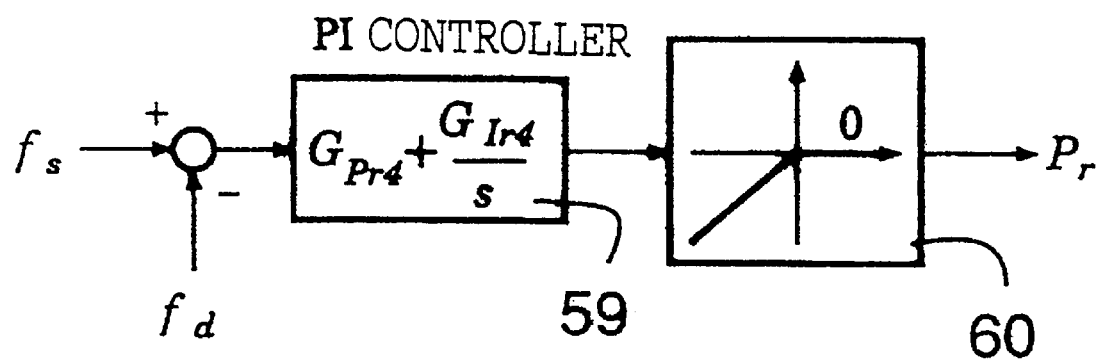
FIG. 24 is a block diagram illustrating an example of the configuration of the braking-force reduction command calculating unit.

As shown in FIG. 24, the braking-force reduction command calculating unit 54 is comprised of: a calculating device for calculating the difference, $f_s-f_d$, between the reference value $f_s$ and the frequency $f_d$ exhibiting a maximum gain; a PI controller 59 for performing proportional-integral control using a proportional gain $G_{Pr4}$ and an integral gain $G_{Ir4}$; and a positive-value eliminating portion 60 which eliminates positive values so that a command will not be given by exceeding the braking force $P_d$ operated by the driver.

In this embodiment as well, the wheel speed signal is processed to detect a change in the amplitude of the resonant-frequency component, so that the controlling apparatus can be realized without the addition of a sensor or the like.

Fifth Embodiment

In a fifth embodiment, correlations between the wheel speed and a simple sine wave of the resonant frequency $f_1$ of the wheel speed are determined to detect the amplitude of the resonant frequency $f_1$ of the wheel speed, and this detecting circuit may be configured by a neural network.

FIG. 25 shows a circuit for detecting the amplitude component of a desired resonant frequency $f_1$ by using the correlations with the simple sine wave. This detecting circuit is comprised of: a delay-time circuit 61 for delaying necessary time-series data by holding them for a fixed time duration $\Delta T$; a product-sum operation portion 62 for calculating a product sum R by adding the multiplications by respective time values of cosine waves having the fixed time duration $\Delta T$ as their period; a product-sum operation portion 63 for calculating a product sum I by adding the multiplications by respective time values of sine waves; and a calculating portion 64 for calculating the square root of the sum of squares of the product sum R and the product sum I.

Here, if it is assumed that the sampling interval of the wheel speed $\omega_w$ is 1 ms, and the frequency to be detected is 40 Hz, one period of the component to be detected is constituted by 25 sampling points. The product sum R and the product sum I are as follows:

$$R = \sum_{i=1}^{25} c_i \omega_{wi} \quad (13)$$

$$I = \sum_{i=1}^{25} s_i \omega_{wi} \quad (14)$$

And the coefficients $c_i$ and $s_i$ are as follows:

$$c_i = \cos\{2\pi(i-1)/25\} \quad (15)$$

$$s_i = \sin\{2\pi(i-1)/25\} (i=1, 2, \ldots, 25) \quad (16)$$

Hence, the determination of the product sum R and the product sum I is none other than the determination of real parts and imaginary parts of Fourier coefficients with respect to the frequency $1/\Delta T$ component. Accordingly, if the square root of the sum of squares of the product sum R and the product sum I is determined, an amplitude value can be obtained.

In this embodiment as well, the wheel speed signal is processed to detect a change in the amplitude of the resonant-frequency component, so that the controlling apparatus can be realized without the addition of a sensor or the like.

Sixth Embodiment

Figure 26:
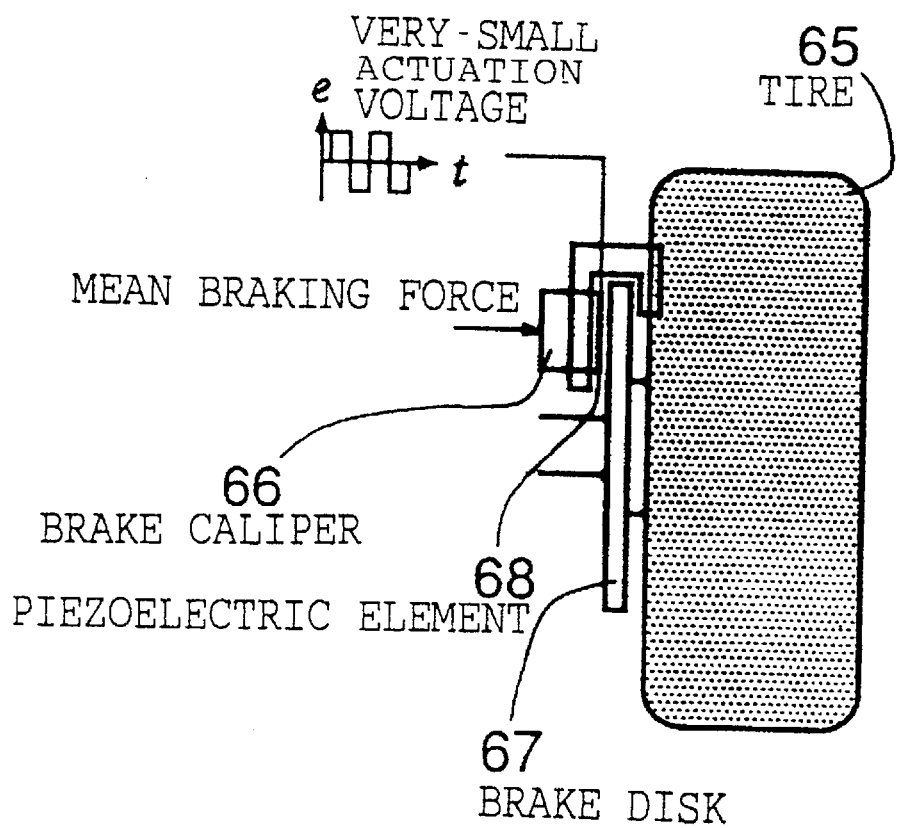
FIG. 26 is a block diagram illustrating an example of the configuration of a braking-force actuating unit using a piezoelectric element.

FIG. 26 is a block diagram illustrating a sixth embodiment in which the braking-force exciting unit is configured by using a piezoelectric element. In this embodiment, the mean braking force with respect to a tire 65 is applied by controlling the pressure within a brake caliper 66. At the same time, a very small actuation voltage is applied to a piezoelectric element 68 disposed on an inner surface of the brake caliper 66 for contact with a brake disk 67, so as to actuate a braking force.

Incidentally, the very-small-braking-force actuation command calculating units 26, 44, and 53 and the braking-force reduction command calculating units 25, 45, 49, and 54 in the foregoing embodiments may be configured by, in addition to those mentioned above, more sophisticated control systems, e.g., robust control systems such as $H_\infty$ control and two-degree-of-freedom control, a neural computer, a fuzzy control system, adaptive control, and the like.

In this case as well, processing is carried out on the basis of the wheel speed from the wheel speed sensor, so that no additional hardware is required. The change of the control algorithm is possible through a change in the program in the computer used for control, and an optimum control system can be easily used.

Although, in the foregoing embodiments, the pressure controlling system is configured by feeding back the actual braking force $P_{b*}$, the control system may be configured by means of program control without feeding back the actual braking force.

Further, if the driving and braking torques can be controlled by electricity as in the case of electric vehicles, excitation is possible by applying very small oscillations to the driving current.

In the case of an electric vehicle in this embodiment, the ABS apparatus can be simply realized by applying very small actuation amplitude to the command of a current controlling system of the electric vehicle, and no additional sensor is needed for detection of the number of revolutions of an electric motor. An instantaneous speed observer or the like can be used in the method of detecting the number of revolutions of the electric motor, and a control system exhibiting higher accuracy can be configured.

Conventionally, in order to derive a value approximating the vehicle speed, it is necessary to extremely reduce the braking force while applying the brakes, which causes uncomfortable vibrations having a relatively low frequency to occur in the wheels. However, in the foregoing embodiments, since the principle of the operation is based on the physical phenomenon of the wheel resonating system, the uncomfortable braking can be eliminated without requiring the absolute vehicle speed.

In addition, since the actuation of the braking force is provided in very small amounts, it is possible to fix the coefficient of friction $\mu$ in the vicinity of the peak value, and the braking distance can be made shorter than in the conventional case in which relatively large fluctuations in amplitude are required.

Further, even if the road surface condition has changed, there similarly occurs a change in the resonant frequency, and a stable operation can be carried out in that case as well. As a result, it is possible to effect a substantial reduction in the tuning processing required in the fabrication of the ABS apparatus.

Only the wheel speed is basically necessary as the sensor signal required for processing, so that the ABS apparatus can be configured by using a relatively inexpensive sensor such as a rotary encoder.

Seventh Embodiment

Although, in the above-described embodiments, a description has been given of the example in which the tire resonance characteristic is detected by using the actuation of the braking force, the detection of the tire resonance characteristic is possible without using the actuation of the braking force. That is, the resonant frequency can be detected from the frequency distribution of the wheel speed during running.

Figure 27:
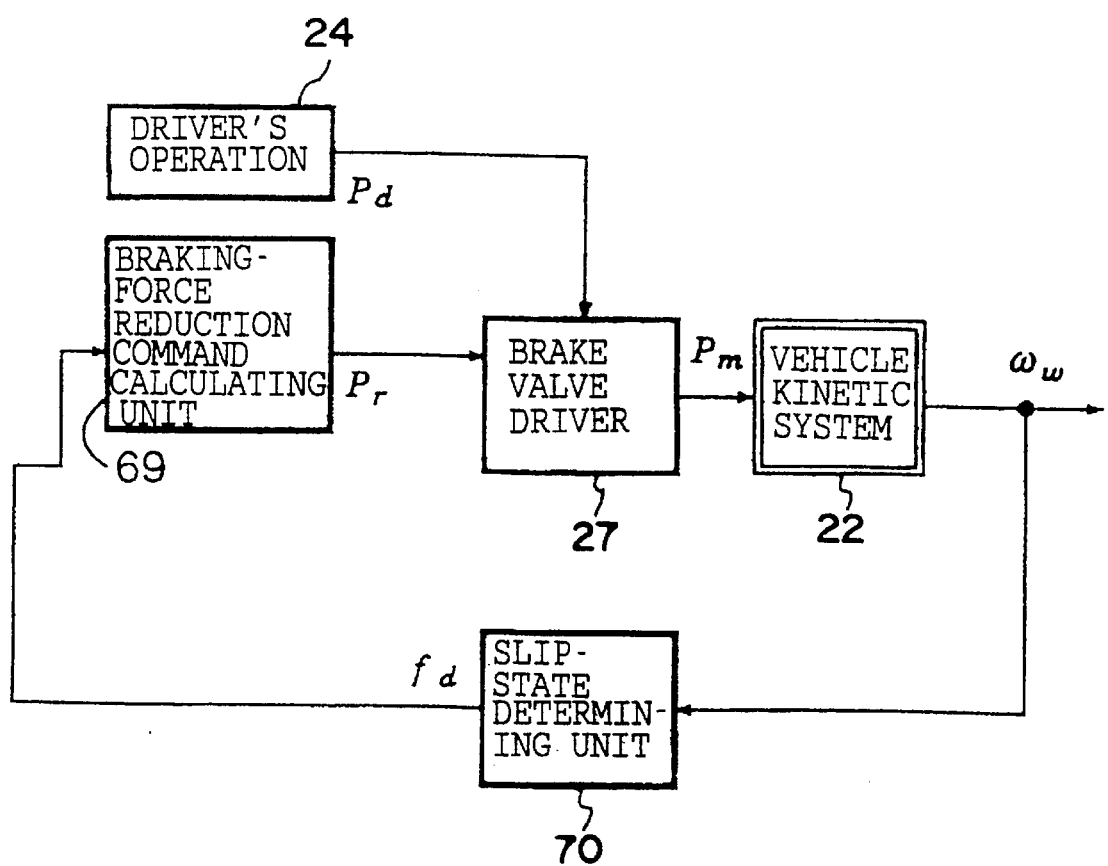
FIG. 27 is a block diagram of the ABS controlling apparatus for following the peak value of μ in accordance with a fifth embodiment of the present invention.

For example, as for the resonant frequency of the tire resonating system, the frequency can be regarded as the resonant frequency when the vibration component of the wheel speed becomes large, and its amplitude value is maximum. An embodiment in which the exciting means is not used is shown in FIG. 27.

Figure 28:
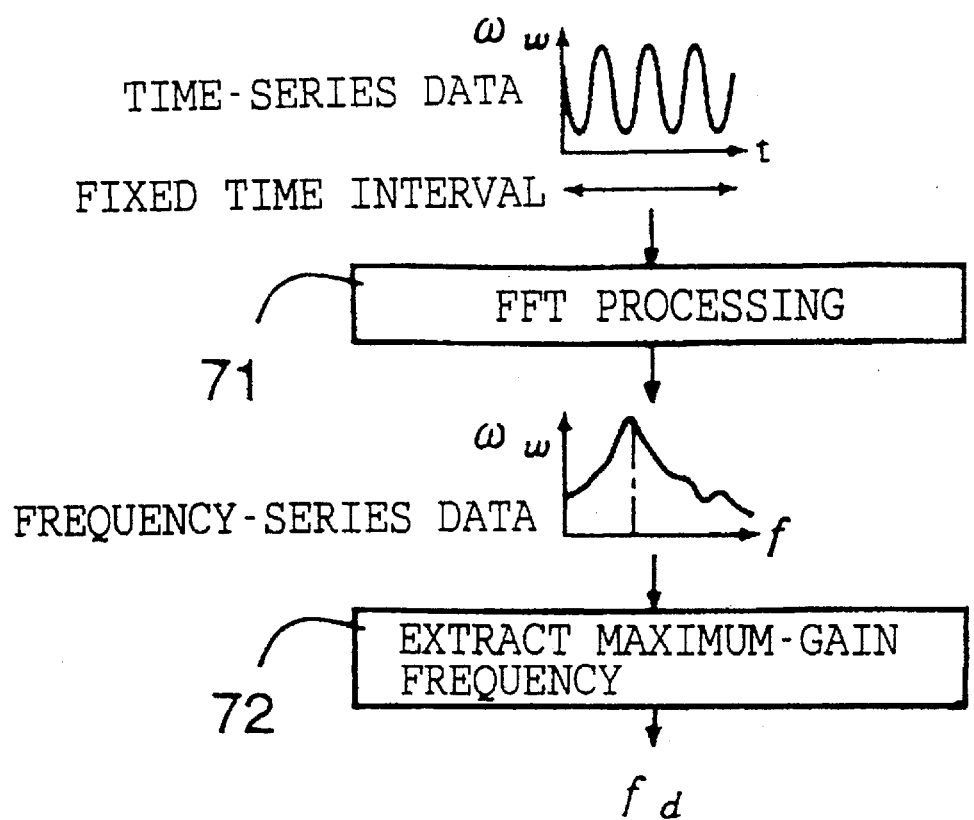
FIG. 28 is a block diagram illustrating an example of the configuration of the slip-state determining unit of the sixth embodiment.

In this case, as for the configuration of a slip-state determining unit 70, as shown in FIG. 28, the frequency-series data is calculated through FFT processing using an FFT processing portion 71 on the basis of the time-series data on the wheel speed $\omega_w$, and the frequency with a maximum gain is extracted by an extracting portion 72, so as to be used as the resonant frequency.

A braking operation which follows the peak value of $\mu$ can be carried out if the command on the mean braking force $P_m$ is calculated by using this slip-state determining unit 70 such that the command is increased if the resonant frequency $f_d$ is smaller than the reference value $f_s$, and the command is decreased if the frequency $f_d$ is greater than the reference value $f_s$.

Figure 29:
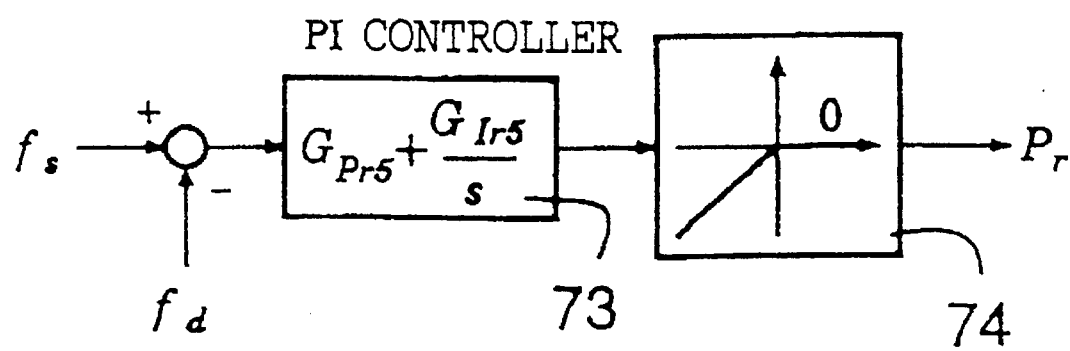
FIG. 29 is a block diagram illustrating an example of the configuration of the braking-force reduction command calculating unit of the seventh embodiment.

In addition, as shown in FIG. 29, a braking-force reduction command calculating unit 69 can be configured by a feedback control system in which the difference, $f_s-f_d$, of the detected value of the resonant frequency $f_d$ with respect to the reference value $f_s$ is used as an input to a PI controller 73 using a proportional gain $G_{Pr5}$ and an integral gain $G_{Ir5}$. In this embodiment as well, only negative values are adopted by a positive-value eliminating circuit 74 so that a command will not be given by exceeding the braking force $P_d$ operated by the driver.

Further, in this embodiment, the frequency at which the amplitude value reaches a peak value is set as the resonant frequency; however, the resonant frequency may be determined by applying the resonance characteristic to the waveform profile of the amplitude-frequency characteristic itself.

In this embodiment as well, changes in the amplitude of the resonant-frequency component are detected by processing the vehicle speed signal, and the ABS can be realized without addition of a sensor and the like to the conventional ABS.

Furthermore, since the excitation of the brake is not required, it is possible to omit an actuator for excitation.

Eighth Embodiment

Figure 30:
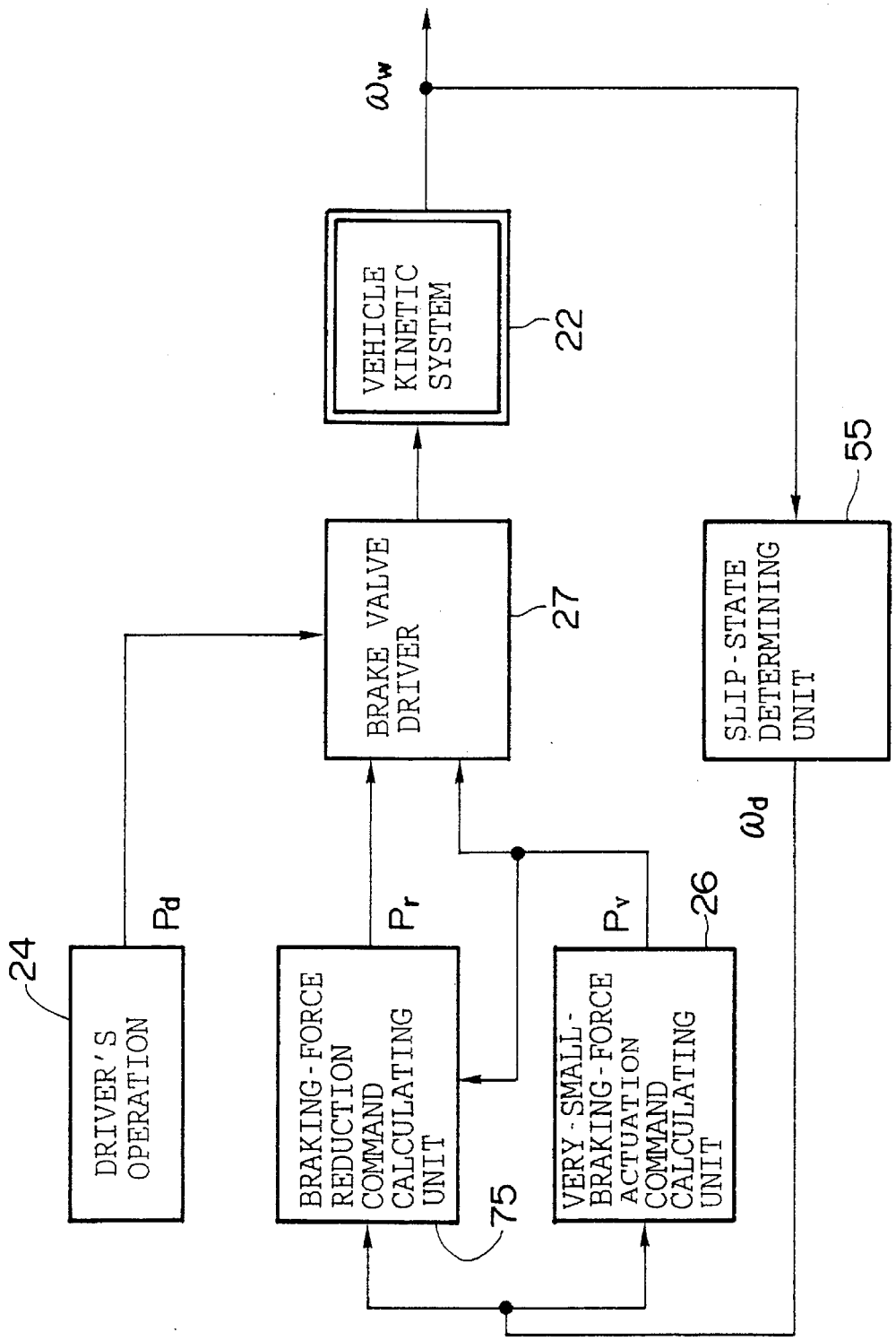
FIG. 30 is a block diagram of the ABS controlling apparatus for following the peak value of μ in accordance with an eighth embodiment of the present invention.
Figure 31:
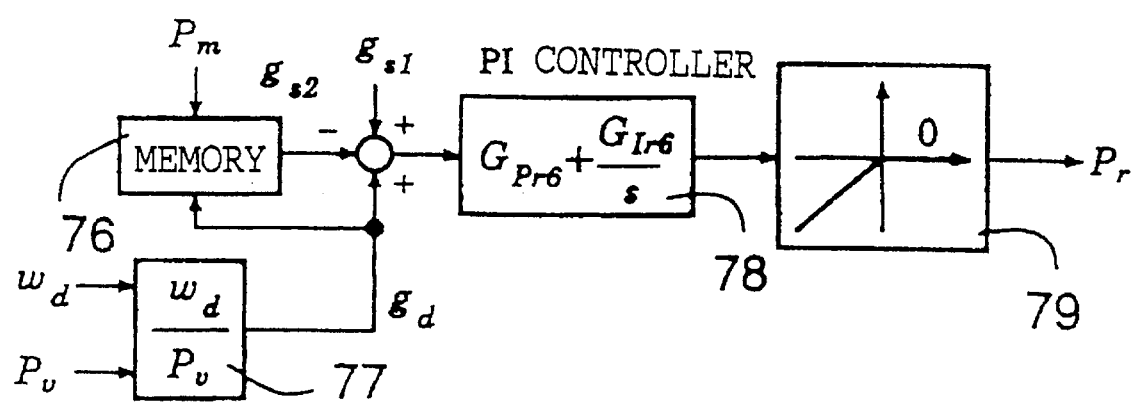
FIG. 31 is a block diagram illustrating an example of the configuration of the braking-force reduction command calculating unit of the eighth embodiment.

FIG. 30 shows an eighth embodiment in which relationships between the wheel speed and the gain of the actuated braking force at the resonant frequency in the state in which the tire is not locked are stored, and a determination is made as to whether the tire is close to a locked state by using a relative decline in the gain, so as to configure the control system. In this embodiment, as shown in FIG. 31, a braking-force reduction command calculating unit 75 is arranged such that an output value $g_d$ from a wheel speed/actuate braking force Gain calculating portion 77 at a time when the mean braking force $P_m$ is sufficiently small is stored in a memory 76, and a reduced braking force is calculated with respect to the difference, $g_{s1}-(g_{s2}-g_d)$, of a reduction, $g_{s2}-g_d$, in the relative gain from a stored value $g_{s2}$ with respect to a reference value $g_{s1}$ by means of a PI-controller 78 using a proportional gain $G_{Pr6}$ and an integral gain $G_{Ir6}$. Only negative values are adopted as $P_r$ by a positive-value eliminating circuit 79 so that a command will not be given by exceeding the braking force $P_d$ operated by the driver.

Since the aforementioned reference value $g_{s1}$ assumes an appropriate value in correspondence with a change in the wheel or the like (wheel replacement or the like), tire locking can be effectively prevented.

In this embodiment, the control system is configured by the wheel speed/actuated braking force gain. However, in a case where the very small amplitude due to the excitation of the braking force is fixed as described above, a configuration can be provided only by the very small amplitude of the wheel speed. On the other hand, if the braking force is actuated in such a manner as to fix the very small amplitude of the wheel speed, it is possible to determine whether the tire is close to a locked state only from the very small amplitude of the braking force, and to calculate a command value.

This embodiment is also basically realized by using a modified form of the existing ABS, and can be realized by merely changing the method of operating the brake valves. This facilitates a change from the existing system. In addition, since the estimation of the vehicle speed is not required, the G sensor or the like for detecting the acceleration or deceleration of the vehicle body is not required, so that hardware can be simplified. Furthermore, since the frequency of the braking-force excitation is several dozens Hz or thereabouts and has a sufficiently very small excitation amplitude, the apparatus can be realized without imparting discomfort to the vehicle occupant.

Ninth Embodiment

In the ABS controlling apparatus in accordance with the first embodiment, it is assumed that the very-small-excitation gain $g_d$ at which the coefficient of friction $\mu$ reaches a peak is fixed irrespective of the wheel speed, and control is provided in such a manner as to reduce the braking force when the detected very-small-excitation gain $g_d$ is smaller than the reference value $g_s$, thereby fixing the coefficient of friction $\mu$ in the vicinity of the peak value of $\mu$. Thus, a maximum braking force is realized in the state in which the tire is gripping.

However, it is experimentally known that the slower the vehicle speed, the greater the very-small-excitation gain $g_d$ in the state of the peak value of $\mu$ becomes. Accordingly, in the ninth embodiment, braking control is maximized on the basis of the difference between the reference value $g_s$ and the very-small-excitation gain $g_d$ which changes in correspondence with the vehicle speed, by changing the reference value $g_s$ in dependence on the wheel speed which is a physical quantity related to the vehicle speed.

Figure 32:
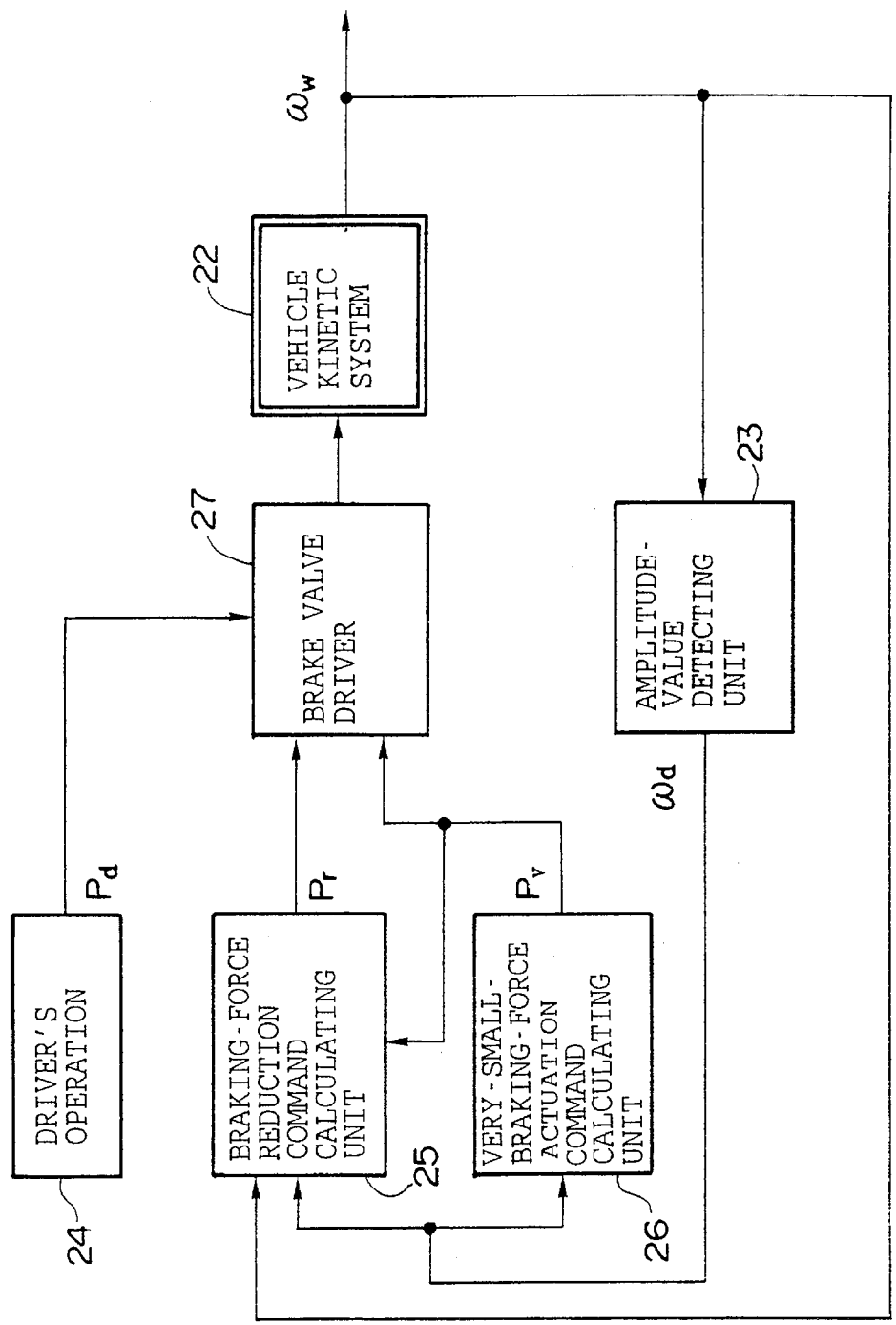
FIG. 32 is a block diagram of the ABS controlling apparatus for following the peak value of μ in accordance with a ninth embodiment of the present invention.

FIG. 32 shows a block diagram of the configuration of this embodiment. It should be noted that the same constituent requirements as those in the first embodiment will be denoted by the same reference numerals, and a description thereof will be omitted.

As shown in FIG. 32, the difference with the first embodiment lies in that the wheel speed $\omega_w$ is inputted to the braking-force reduction command calculating unit 25.

Figure 33:
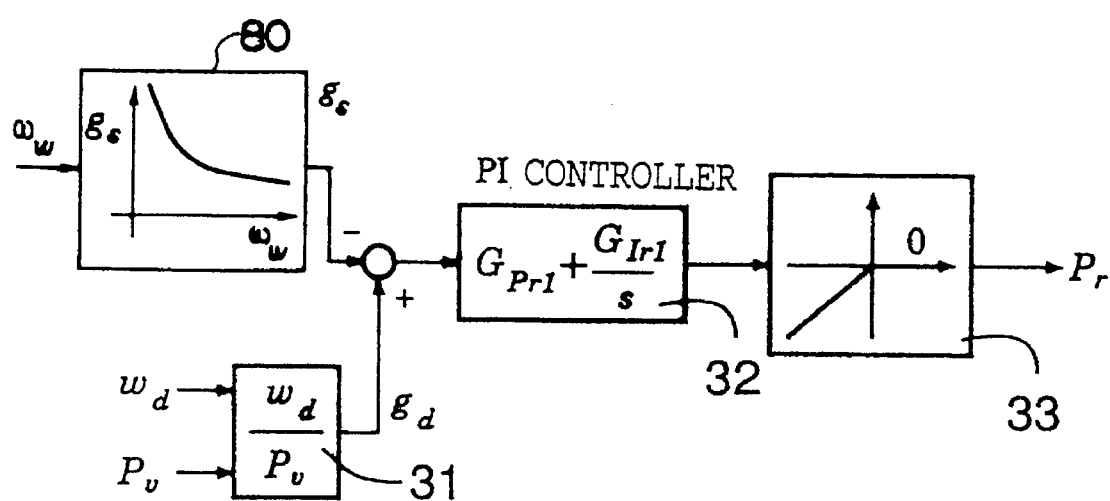
FIG. 33 is a block diagram illustrating an example of the configuration of the braking-force reduction command calculating unit.

As shown in FIG. 33, this braking-force reduction command calculating unit 25 further comprises a command-gain calculating portion 80 which calculates an optimum reference value on the basis of the inputted wheel speed $\omega_w$ and outputs the same as a command gain $g_s$. In this command-gain calculating portion 80, a table indicating how to change the command gain $g_s$ in response to the wheel speed $\omega_w$ is stored in its internal memory.

Figure 34:
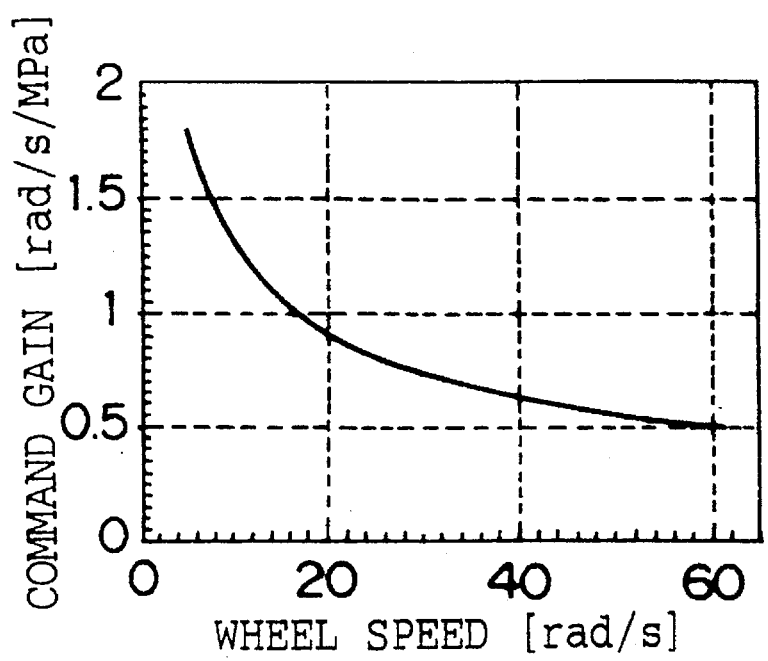
FIG. 34 is a diagram illustrating relationship in which a command gain $g_s$ is changed in correspondence with a wheel speed $\omega_w$.

As shown in FIG. 34, the detailed relationship between the wheel speed $\omega_w$ and the command gain $g_s$ in this table is determined such that the command gain $g_s$ becomes small when the wheel speed $\omega_w$ is fast, and the command gain $g_s$ becomes large as the wheel speed $\omega_w$ becomes slow, i.e., such that the command gain $g_s$ is reduced monotonously in response to the wheel speed $\omega_w$. This setting is provided to cope with the very-small-excitation gain $g_d$ which becomes larger as the wheel speed $\omega_w$ becomes slower.

When the wheel speed $\omega_w$ is inputted to the command-gain calculating portion 80, the command-gain calculating portion 80 refers to a table indicating the relationship shown in FIG. 34, and determines and outputs the value of the command gain $g_s$ corresponding to the inputted wheel speed $\omega_w$. Accordingly, the smaller the inputted wheel speed $\omega_w$, the command gain $g_s$ having the greater value is outputted.

The calculating portion 31 calculates the very-small-excitation gain $g_d$. This very-small-excitation gain $g_d$ changes to a larger value as the wheel speed $\omega_w$ becomes smaller, as described above.

Next, the very-small-excitation gain $g_d$ calculated by the calculating portion 31 and its difference, $g_d$–$g_s$, with respect to the command gain $g_s$ calculated by the command-gain calculating portion 80 are inputted to the PI controller 32. The reduced braking force is calculated on the basis of this difference. The positive-value eliminating portion 33 eliminates a positive value from the calculated reduced braking force, and outputs the braking-force reduction command $P_r$.

In this control based on the braking-force reduction command $P_r$, if the very-small-excitation gain $g_d$ is larger than the command gain $g_s$, it is assumed that the tire is gripping, and the mean braking force $P_m$ is maintained; meanwhile, if the very-small-excitation gain $g_d$ is smaller than the command gain $g_s$, the coefficient of friction is approaching the peak value of $\mu$, so that the mean braking force $P_m$ is reduced. At this time, although the very-small-amplitude gain $g_d$ changes with a change in the wheel speed $\omega_w$, the command gain $g_s$ is also changed to cancel that change, so that it is possible to control a maximum braking force for maintaining the peak value of $\mu$ at each speed.

As described above, as the command gain $g_s$ is changed in dependence on the wheel speed $\omega_w$, it is possible to realize a maximum braking force in the state in which the tires are gripping at each vehicle speed, and it is possible to reduce the stopping distance and the stopping time.

It should be noted that although, in this embodiment, the command gain $g_s$ is changed in dependence on the wheel speed $\omega_w$, the command gain $g_s$ may be changed in dependence on a physical quantity related to the vehicle speed other than the wheel speed $\omega_w$.

What is claimed is:

1. An anti-lock brake controlling apparatus comprising:

detecting means for detecting a vibration characteristic of a wheel which is rotating at a certain speed; and controlling means for controlling a mean braking force acting on the wheel on the basis of the detected vibration characteristic such that a slip ratio between a tire and a road surface is not larger than a value at which a coefficient of friction between the tire and the road surface substantially reaches a peak value.

2. An anti-lock brake controlling apparatus according to claim 1, further comprising: actuating means for causing the braking force acting on the wheel to be actuated by a small amount at a predetermined frequency.

3. An anti-lock brake controlling apparatus comprising:

resonant-frequency detecting means for detecting a resonant frequency from a frequency distribution of a wheel which is rotating at a certain speed; and controlling means for reducing a mean braking force acting on the wheel when the resonant frequency is greater than a reference value.

4. An anti-lock brake controlling apparatus according to claim 3, wherein said controlling means increases the mean braking force when the resonant frequency is smaller than the reference value.

5. An anti-lock brake controlling apparatus according to claim 3, wherein said resonant-frequency detecting means determines as the resonant frequency a frequency at which an amplitude value of a vibration component of the wheel speed is maximum.

6. An anti-lock brake controlling apparatus according to claim 3, wherein said resonant-frequency detecting means includes:

transforming means for transforming the wheel speed into frequency-series data, and extracting means for extracting as the resonant frequency a frequency at which an amplitude is maximum.

7. An anti-lock brake controlling apparatus comprising:

actuation means for actuation by a very small amount a braking force acting on a wheel at a resonant frequency of a vibrating system constituted by a vehicle body, a wheel, and a road surface;

detecting means for detecting an amplitude of a component of the resonant frequency of a wheel speed; and controlling means for reducing a mean braking force acting on the wheel when a gain in the amplitude of the resonant-frequency component of the wheel speed with respect to an amplitude of the small excitation of the braking force is smaller than a reference value.

8. An anti-lock brake controlling apparatus according to claim 7, wherein said actuating means actuates by a small amount the braking force controlled by a driver, at the same frequency as the resonant frequency of the wheel speed persisting at a time when a tire is gripping.

9. An anti-lock brake controlling apparatus according to claim 7, wherein said controlling means detects the amplitude of the wheel speed by obtaining correlations between the wheel speed and a simple sine wave of the resonant frequency of the wheel speed.

10. An anti-lock brake controlling apparatus according to claim 7, wherein said detecting means includes:

wheel-speed detecting means for detecting the wheel speed;

a band-pass filter connected to said wheel-speed detecting means, said band-pass filter having a predetermined pass band range including the resonant frequency of the wheel speed persisting at a time when a tire is gripping; and a.c./d.c. converting means for converting an output from said band-pass filter into a d.c. signal.

11. An anti-lock brake controlling apparatus according to claim 7, wherein said controlling means increases the mean braking force when the gain is greater than the reference value.

12. An anti-lock brake controlling apparatus according to claim 7, wherein said controlling means includes:

calculating means for calculating the gain in the amplitude of the resonant-frequency component of the wheel speed with respect to the amplitude of the small actuation of the braking force;

calculating means for calculating a deviation of the gain with respect to the reference value;

PI controlling means for outputting a reduced braking-force command for effecting proportional-integral control based on the deviation; and positive-value eliminating means for eliminating a positive value of the reduced braking-force command and applying only a negative value to the wheel so that the command will not be given by exceeding the braking force operated by the driver, and for delivering an output as the reduced braking-force command for reducing the mean braking force.

13. An anti-lock brake controlling apparatus according to claim 7, wherein said controlling means includes:

calculating means for calculating the gain in the amplitude of the resonant-frequency component of the wheel speed with respect to the amplitude of the small actuation of the braking force;

storage means for storing the gain in a state in which the tire is not locked;

calculating means for calculating a difference between the gain calculated by said calculating means and the gain stored in said storage mean;

calculating means for calculating a deviation of the difference with respect to the reference value;

pI controlling means for outputting a reduced braking-force command for effecting proportional-integral control based on the deviation; and positive-value eliminating means for eliminating a positive value of the reduced braking-force command and applying only a negative value to the wheel so that the command will not be given by exceeding the braking force operated by the driver, and for delivering an output as the reduced braking-force command for reducing the mean braking force.

14. An anti-lock brake controlling apparatus according to claim 7, further comprising:

physical-quantity detecting means for detecting the vehicle speed or a physical amount related to the vehicle speed, wherein the reference value is changed in dependence on the vehicle speed or the physical amount related to the vehicle speed detected by said physical-quantity detecting means.

15. An anti-lock brake controlling apparatus according to claim 14, wherein the reference value is made smaller as the vehicle speed or the physical quantity related to the vehicle speed becomes larger.

16. An anti-lock brake controlling apparatus comprising:

actuating means for actuating by a very small amount a braking force acting on a wheel at a resonant frequency of a vibrating system constituted by a vehicle body, a wheel, and a road surface at a fixed amplitude;

detecting means for detecting an amplitude of a component of the resonant frequency of a wheel speed; and controlling means for reducing a mean braking force acting on the wheel when the amplitude of the resonant-frequency component of the wheel speed detected by said detecting means is smaller than a reference value.

17. An anti-lock brake controlling apparatus according to claim 16, wherein said controlling means increases the mean braking force when the amplitude of the resonant-frequency component is greater than the reference value.

18. An anti-lock brake controlling apparatus comprising:

actuating means for actuating by a small amount a braking force acting on a wheel at a resonant frequency of a vibrating system constituted by a vehicle body, a wheel, and a road surface and at a fixed amplitude corresponding to an amplitude command;

detecting means for detecting an amplitude of a component of the resonant frequency of a wheel speed; and controlling means for determining the amplitude command such that the amplitude of the resonant-frequency component of the wheel speed detected by said detecting means becomes a reference value, said controlling means having means for reducing a mean braking force acting on the wheel when the amplitude command is greater than a reference amplitude value.

19. An anti-lock brake controlling apparatus according to claim 18, wherein said controlling means further has means for increasing the mean braking force acting on the wheel when the amplitude command is smaller than the reference amplitude value.

20. An anti-lock brake controlling apparatus comprising:

actuating means for actuating by a very small amount a braking force acting on a wheel at a resonant frequency of a vibrating system constituted by a vehicle body, a wheel, and a road surface;

detecting means for detecting a wheel speed; and controlling means for reducing a mean braking force acting on the wheel when a frequency at which a gain in the amplitude of the wheel speed with respect to an amplitude of the braking force becomes maximum is greater than a reference value.

21. An anti-lock brake controlling apparatus according to claim 20, wherein said actuating means actuates by a very small amount the braking force controlled by a driver, at the same frequency as the resonant frequency of the wheel speed persisting at a time when a tire is gripping.

22. An anti-lock brake controlling apparatus according to claim 20, wherein said controlling means further includes:

converting means for converting each of the wheel speed and the amplitude of the braking force into frequency-series data;

calculating means for calculating a gain of the wheel speed with respect to the amplitude of the braking force for each frequency in the frequency-series data; and extracting means for extracting a frequency at which the gain becomes maximum.

23. An anti-lock brake controlling apparatus according to claim 20, wherein said controlling means further having means for increasing the mean braking force when the frequency is smaller than the reference value.

* * * * *